(12) United States Patent
Ibrahim et al.

(10) Patent No.: US 10,374,423 B2
(45) Date of Patent: Aug. 6, 2019

(54) POWER COMBINER SYSTEMS AND METHODS

(71) Applicant: Argentum Electronics, Inc., Toronto (CA)

(72) Inventors: Bolis Ibrahim, Toronto (CA); Oleh Zhyhinas, Toronto (CA); Kamil Aleksander Wyszynski, Toronto (CA)

(73) Assignee: ARGENTUM ELECTRONICS, INC., Toronto, Ontario (CA)

( * ) Notice: Subject to any disclaimer, the term of this patent is extended or adjusted under 35 U.S.C. 154(b) by 99 days.

(21) Appl. No.: 15/388,824

(22) Filed: Dec. 22, 2016

(65) Prior Publication Data
US 2017/0104328 A1   Apr. 13, 2017

Related U.S. Application Data

(63) Continuation-in-part of application No. 15/321,420, filed as application No. PCT/IB2016/054938 on Aug. 18, 2016.

(60) Provisional application No. 62/206,270, filed on Aug. 18, 2015.

(51) Int. Cl.
| | |
|---|---|
| *H02J 1/10* | (2006.01) |
| *H02J 1/12* | (2006.01) |
| *G05F 1/66* | (2006.01) |

(52) U.S. Cl.
CPC .................. *H02J 1/12* (2013.01); *G05F 1/66* (2013.01); *H02J 1/10* (2013.01)

(58) Field of Classification Search
CPC ........................................................ H02J 1/10
USPC ................. 307/11, 18–19, 24, 29, 66, 85–87
See application file for complete search history.

(56) References Cited

U.S. PATENT DOCUMENTS

| | | | | |
|---|---|---|---|---|
| 4,287,465 A | * | 9/1981 | Godard | ..................... H02J 1/14 320/101 |
| 4,314,327 A | | 2/1982 | Depuy | |
| 4,323,788 A | | 4/1982 | Smith | |
| 4,766,364 A | | 8/1988 | Biamonte et al. | |
| 5,001,623 A | | 3/1991 | Magid | |
| 5,610,807 A | * | 3/1997 | Kanda | ................... H02M 3/158 307/125 |
| 5,886,508 A | | 4/1999 | Jutras | |
| 5,959,368 A | | 9/1999 | Kubo et al. | |

(Continued)

FOREIGN PATENT DOCUMENTS

| | | |
|---|---|---|
| EP | 2538515 A1 | 12/2012 |
| WO | 2014059236 A1 | 4/2014 |

OTHER PUBLICATIONS

International Search Report dated Oct. 31, 2016 in Application No. PCT/IB2016/054938.

(Continued)

*Primary Examiner* — Adi Amrany
(74) *Attorney, Agent, or Firm* — Knobbe, Martens, Olson & Bear, LLP

(57) ABSTRACT

Power combiner systems and methods for combining power from a number of power sources, which can differ in output power level, to at least one output. A controller monitors energy storage elements and controls a switch network to dynamically charge and discharge the energy storage elements while matching a desired output level. The controller can dynamically direct the switch network to alter inputs and outputs, thereby changing the frequency and order in which energy storage elements are connected.

27 Claims, 17 Drawing Sheets

(56) References Cited

U.S. PATENT DOCUMENTS

| | | | |
|---|---|---|---|
| 6,177,783 B1 | 1/2001 | Donohue | |
| 6,355,990 B1* | 3/2002 | Mitchell | H02J 1/06 |
| | | | 307/125 |
| 6,420,839 B1 | 7/2002 | Chiang et al. | |
| 6,522,190 B1 | 2/2003 | Malik et al. | |
| 6,768,225 B2 | 7/2004 | Chang et al. | |
| 6,873,134 B2 | 3/2005 | Canter et al. | |
| 7,009,313 B1 | 3/2006 | Parramon et al. | |
| 7,126,312 B2 | 10/2006 | Moore | |
| 7,227,277 B2 | 6/2007 | Chapman | |
| 7,256,568 B2 | 8/2007 | Lam et al. | |
| 7,456,523 B2 | 11/2008 | Kobayashi | |
| 7,538,527 B2 | 5/2009 | O'Driscoll et al. | |
| 7,598,706 B2 | 10/2009 | Koski et al. | |
| 7,796,412 B2* | 9/2010 | Fornage | H02M 3/285 |
| | | | 323/906 |
| 7,863,772 B2 | 1/2011 | Dwelley et al. | |
| 8,189,351 B2 | 5/2012 | Chung et al. | |
| 8,193,761 B1 | 6/2012 | Singh | |
| 8,274,172 B2* | 9/2012 | Hadar | H01L 31/02021 |
| | | | 307/5 |
| 8,310,094 B2* | 11/2012 | Yamada | H02J 7/35 |
| | | | 307/46 |
| 8,860,246 B2* | 10/2014 | Hadar | H02J 3/385 |
| | | | 307/19 |
| 9,184,594 B2 | 11/2015 | Garabandic | |
| 9,716,406 B2* | 7/2017 | Beck | H02J 3/32 |
| 2007/0179720 A1* | 8/2007 | Becker | H02J 3/383 |
| | | | 702/58 |
| 2008/0072080 A1 | 3/2008 | Chapuis et al. | |
| 2008/0122518 A1 | 5/2008 | Besser et al. | |
| 2008/0174275 A1* | 7/2008 | Nakao | H02J 7/0013 |
| | | | 320/128 |
| 2009/0295330 A1* | 12/2009 | Li | H02J 7/0013 |
| | | | 320/124 |
| 2009/0302681 A1 | 12/2009 | Yamada et al. | |
| 2010/0102882 A1* | 4/2010 | Yoshino | B41J 2/04541 |
| | | | 330/251 |
| 2011/0019444 A1* | 1/2011 | Dargatz | H02H 1/0015 |
| | | | 363/50 |
| 2011/0273130 A1* | 11/2011 | Lee | H01M 10/465 |
| | | | 320/101 |
| 2012/0153729 A1 | 6/2012 | Song et al. | |
| 2012/0175963 A1 | 7/2012 | Adest et al. | |
| 2013/0181527 A1* | 7/2013 | Bhowmik | H02M 7/44 |
| | | | 307/63 |
| 2013/0241294 A1 | 9/2013 | Cleland | |
| 2013/0271062 A1* | 10/2013 | Lu | H02J 7/35 |
| | | | 320/101 |
| 2014/0167505 A1* | 6/2014 | Beck | H02J 3/32 |
| | | | 307/23 |
| 2014/0183953 A1 | 7/2014 | Harrison | |
| 2015/0048681 A1 | 2/2015 | Kwasinski et al. | |

OTHER PUBLICATIONS

Kosare et al: "Design and Simulation of Multiple-Input Single-Output DC-DC Converter", Students' publication at EE Branch; available at http://www.academia.edu/5430740/Design_and_Simulation_of_Multiple-Input_Single-Output_DC-DC_Converter; Original publication date unknown; Version submitted herewith downloaded on Feb. 22, 2017.

Matsuo et al.: "Characteristics of the Multiple-Input DC-DC Converter", IEEE Transactions on Industrial Electronics, vol. 51, No. 3, Jun. 2004.

Afridi et al: "Enhanced Bipolar Stacked Switched Capacitor Energy Buffers", 2012 IEEE Energy Conversion Congress and Exposition, pp. 4209-4216, Sep. 2012.

Chen et al: "Stacked Switched Capacitor Energy Buffer Architecture", Department of Electrical Engineering and Computer Science, 2012 IEEE Applied Power Electronics Conference, pp. 1404-1413, Feb. 2012.

Karteek Gummi: "Derivation of New Double-Input DC-DC Converters Using the Double Block Methodology", Thesis—Master of Science in Electrical Engineering, 2008, Missouri University of Science and Technology, retrieved from http://power.mst.edu/media/academic/power/documents/theses/Thesis_Karteek_Gummi.pdf; 2008.

International Search Report dated Apr. 28, 2017; in connection to PCT/CA2017/050211.

International Search Report dated Aug. 18, 2017, in connection to PCT/CA2016/051442.

The Office Action dated Aug. 29, 2018, received in connection to co-pending U.S. Appl. No. 15/436,231.

* cited by examiner

POWER COMBINER SYSTEMS AND METHODS

RELATED APPLICATIONS

The present application is a continuation-in-part of application Ser. No. 15/321,420, which is the U.S. national stage under 35 U.S.C. § 371 of International Application No. PCT/IB2016/054938, filed Aug. 18, 2016, which claims priority under 35 U.S.C. § 119(e) to Provisional Application No. 62/206,270, filed Aug. 18, 2015.

FIELD

The described embodiments relate to the combination of multiple power sources in an electrical network, and more particularly to the combination of various DC power sources.

INTRODUCTION

Conventionally, combining multiple different power sources in a single electrical network has presented a challenge, particularly where the power sources have different voltages or currents at their peak efficiency, resulting in different maximum power points.

The maximum power point can be characterized as the operating point for a power source that provides the highest power transfer efficiency. That is, for any given set of operational conditions, the maximum power point for a power source will correspond to voltage and current values that provide a maximum power output. The maximum power point can vary over time, as operating conditions and loads change.

Generally, power sources will have a particular output voltage or small voltage range that corresponds to the maximum power point. When the output voltage is lowered or raised, for example due to time-varying behavior of the load or external factors affecting power generation, the output power may be reduced. This relationship is illustrated in FIG. 9.

For example, an array of identical photovoltaic cells may exhibit varying power output levels due to uneven cloud cover affecting cell voltage. This can cause the power outputs of the photovoltaic cells to be mismatched.

When multiple power sources are combined in series, they may not have the same current at the maximum power point, and since the current must be equal across all sources, one or more of the power sources will not operate at their respective maximum power points.

Alternatively, if power sources are combined in parallel, they may not have the same voltage at the maximum power point. Since the voltage across all power sources must be the same in a parallel configuration, some or all of the power sources may not operate at their respective maximum power points.

Previous topologies have been developed to connect multiple power sources to a load. PCT Publication No. WO2014/059236 A1 describes one topology that involves the individual control and regulation of each power source. As illustrated in FIG. 1, each power source 110a to 110n has a maximum power point tracking (MPPT) module 111a to 111n connected to it, with the outputs of the MPPT modules connected together to an electrical network 130, which in turn has loads 140a to 140n. The output voltage of the each MPPT module 111a to 111n is regulated to a common voltage of the electrical network 130, which is in turn supplied to the loads 140a to 140n. The requirement for a plurality of MPPT modules corresponding to each power source increases the complexity and cost of this approach, and has therefore limited its usefulness.

H. Matsuo et al., "Characteristics of the Multiple-Input DC-DC Converter," IEEE Trans. Ind. Electron., vol. IE-51, pp. 625-631, June 2004, describe another method to combine power sources, which is to connect them together through a transformer, with each power source having windings around a common core. This method results in what is essentially a buck-boost type DC-DC converter system, albeit with the inductor substituted by a transformer having multiple input windings. Such a system can be expensive to implement and does not scale well, as it requires an increasingly larger transformer for each additional power source.

SUMMARY

In a broad aspect, there is provided a system for combining electrical power from a plurality of power sources, the system comprising: a plurality of energy storage elements arranged in a plurality of sets, each of the plurality of sets corresponding to a respective one of the plurality of power sources; a plurality of voltage sensors coupled respectively to each of the plurality of energy storage elements; a plurality of output switches corresponding respectively to each of the plurality of energy storage elements; a controller communicatively coupled to the plurality of voltage sensors and the plurality of output switches, and configured to: determine a respective state for each selected element of the plurality of energy storage elements; based on the respective state of each of the plurality of energy storage elements, determining at least one output element from the plurality of energy storage elements; and direct at least one of the plurality of output switches to couple the output element to at least one output.

In some cases, the system may further comprise a plurality of input switches corresponding respectively to each of the plurality of energy storage elements, each of the plurality of input switches coupling a respective energy storage element to a respective power source, wherein the controller is further configured to decouple the output element from its respective power source.

In some cases, the controller is further configured to direct at least one of the output switches to decouple a previous output element from the output, and to direct at least one of the input switches to recouple the previous output element to its respective power source.

In some cases, the controller is further configured to periodically repeat the determining, the decoupling the output element, the decoupling the previous output element, the recoupling and the coupling to selectively switch between the plurality of energy storage elements.

In some cases, the controller is configured to: receive from the plurality of voltage sensors a plurality of node voltages corresponding respectively to the plurality of energy storage elements, and determine that a selected node voltage corresponding to the output element is closest to the respective peak charging voltage of the output element.

In some cases, the controller is configured to determine a plurality of energy levels corresponding respectively to the plurality of energy storage elements, wherein the selecting is based on the plurality of energy levels.

In some cases, the controller is configured to enforce a minimum or maximum output power when selecting the output element. In some cases, the controller is configured to enforce a minimum or maximum output voltage when selecting the output element.

In some cases, the system may further comprise a dynamic load, wherein the output element is coupled to the output via a dynamic load. In some cases, the dynamic load is a DC-DC converter.

In some cases, wherein a period of the periodic repeating is determined based on a discharge time of the plurality of storage elements.

In some cases, the respective state is a peak voltage. In some cases, the respective state is a peak charging voltage that corresponds to a highest charging rate for the selected element.

In some cases, wherein the at least one output comprises a plurality of outputs.

In another broad aspect, there is provided a method of combining electrical power from a plurality of power sources, the method comprising: providing a plurality of energy storage elements arranged in a plurality of sets, each of the plurality of sets corresponding to a respective one of the plurality of power sources; determining a respective state for each selected element of the plurality of energy storage elements; based on the respective state of each of the plurality of energy storage elements, determining at least one output element from the plurality of energy storage elements; and coupling the at least one output element to an electrical network.

In some cases, coupling the at least one output element to the electrical network further comprises decoupling the output element from its respective power source.

In some cases, coupling the at least one output element to the electrical network comprises decoupling a previous output element from the output and recoupling the previous output element to its respective power source.

In some cases, the method may further comprise periodically repeating the determining, the decoupling the output element, the decoupling the previous output element, the recoupling and the coupling to selectively switch between the plurality of energy storage elements.

In some cases, the determining comprises measuring a plurality of node voltages corresponding respectively to the plurality of energy storage elements, and determining that a selected node voltage corresponding to the output element is closest to the respective peak charging voltage of the output element.

In some cases, the determining further comprises determining a plurality of energy levels corresponding respectively to the plurality of energy storage elements, wherein the determining is based on the plurality of energy levels.

In some cases, the determining further comprises enforcing a minimum or maximum output power. In some cases, the determining further comprises enforcing a minimum or maximum output voltage.

In some cases, the output element is coupled to the output via a dynamic load. In some cases, the dynamic load is a DC-DC converter.

In some cases, a period of the periodic repeating is determined based on a discharge time of the plurality of storage elements.

In some cases, the respective state is a peak voltage. In some cases, the respective state is a peak charging voltage that corresponds to a highest charging rate for the selected element.

In some cases, the at least one output comprises a plurality of outputs.

In another broad aspect, there is provided a wide range power combiner (WRPC) system comprising: a plurality of input power sources; a set of energy storage elements, with at least two energy storage elements per power source, such that each of the energy storage elements can be connected to a power source or an output or outputs; a set of switches, connecting the energy storage elements to the input power sources and the output(s); at least one measurement device, for the measurement of energy storage elements; a controller comprising: a control loop for the system (e.g., executed by the controller), wherein the control loop learns the maximum power point for each power source, and connects and disconnects different storage elements to and from the system output; systems constraints (e.g., stored in a memory) for managing limitations to maintain energy output, voltages, currents, and other variables within system parameters.

In some cases, the energy storage elements are provided in at least a 2:1 ratio of storage elements to power sources.

In some cases, the energy storage elements are substantially identical.

In some cases, the input power of each source is controlled to achieve the maximum power point of that source.

In some cases, the maximum power point is detected automatically by the system controller.

In some cases, the controller is configured to measure the energy stored in the energy storage elements, to determine the output power of the power sources.

In some cases, the controller uses voltage measurements and the properties of the energy storage element to calculate the energy stored in the energy storage element.

In some cases, all but one of the energy storage elements are each connected to their respective input power sources, and all but one of the input power sources each being connected to at least two energy storage elements.

In some cases, the controller selects which energy storage element to connect to the output, in order to maintain the maximum power point of each input power source.

DRAWINGS

A preferred embodiment of the present invention will now be described in detail with reference to the drawings, in which.

DESCRIPTION OF VARIOUS EMBODIMENTS

Figure 1:
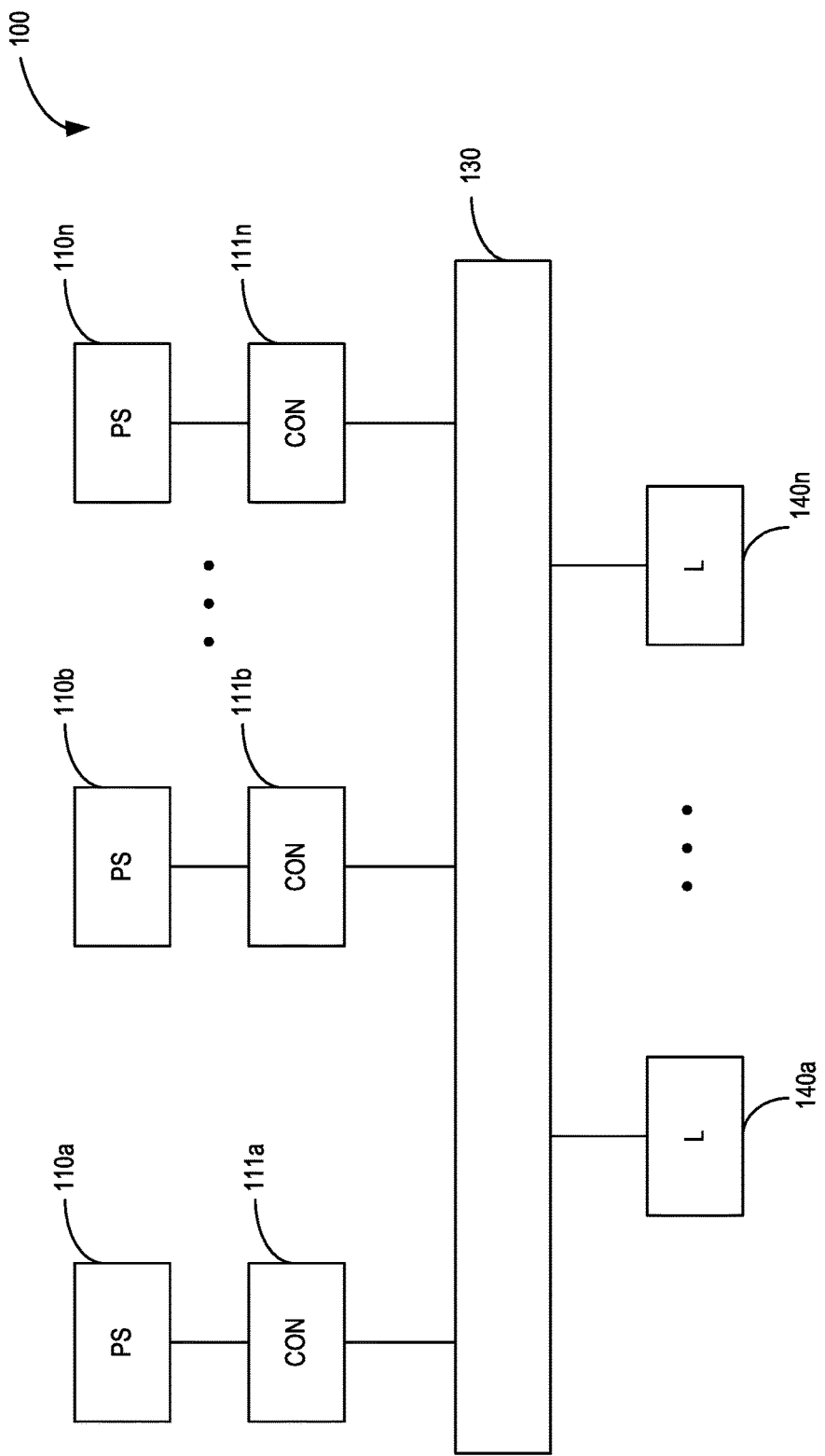
FIG. 1 is a prior art power combiner system.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail since these are known to those skilled in the art. Furthermore, it should be noted that this description is not intended to limit the scope of the embodiments described herein, but rather as merely describing one or more exemplary implementations.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

Furthermore, any recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a pushbutton keyboard, mouse, a touchscreen, and the like), and at least one output device (e.g. a display screen, a printer, a wireless radio, and the like) depending on the nature of the device.

It should also be noted that there may be some elements that are used to implement at least part of one of the embodiments described herein that may be implemented via software that is written in a high-level computer programming language. Accordingly, the program code may be written in C, C++ or any other suitable programming language and may comprise modules or classes, as is known to those skilled in the art. Alternatively, or in addition thereto, some of these elements implemented via software may be written or provided in assembly language, machine language or byte code as needed. In either case, the language may be a compiled or interpreted language.

At least some of these software programs may be stored on a storage media (e.g., a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for execution by one or more processors. The medium may be provided in various forms, including non-transitory forms such as, but not limited to, one or more diskettes, compact disks, tapes, chips, and magnetic and electronic storage.

Embodiments of the systems and methods described herein facilitate the combining of power from a plurality of input sources that may differ in output voltages and currents, to one or more outputs or loads. The described embodiments can be used to minimize power loss where voltages or currents of different values are to be combined in any circuit topology. Embodiments may have a plurality of power inputs and at least one power output. Embodiments may also have switches and energy storage elements in an electrical path, or paths, from the power inputs to the at least one power output. An energy storage element, or elements, can be connected at the output, or outputs, for the purpose of smoothing inconsistencies in the output power. Power from the inputs is stored in the energy storage elements, until the switches create an electrical path, or paths, to the output, or outputs.

Power inputs, energy storage elements and the power output, or outputs, are connected through switches. Some energy storage elements store power from the power inputs while some energy storage elements release power to the power output, or outputs. Energy storage elements alternate between storing energy from the power input, or inputs, and releasing energy to the power output, or outputs. The switches may alternate the electrical path, or paths, from energy storage from the power input, or inputs, to energy release to the power output, or outputs. This arrangement of energy storage elements and switches can be scaled to the number of power inputs. In some embodiments a controller can transmit signals to the switches and monitor the energy storage elements. Switches can be any electrical switch including, but not limited to, transistors and relays. Energy storage elements can be any electrical energy storage element including, but not limited to, capacitors and inductors.

The described embodiments generally provide for combining the output of multiple power sources, each of which may have differing maximum power points, into one or more power outputs while attempting to enhance and maximize efficiency. Power sources of varying types may be used; examples of suitable power sources include, but are not limited to, photovoltaic, wind turbine, geothermal, chemical battery, tidal, hydroelectric, etc. Conventional power sources, such as steam-powered turbines, may also be used. The described embodiments generally monitor power produced by each power source and regulate output power by operating switches provided between the power sources, a plurality of energy storage elements and the output or outputs. Generally, the described embodiments attempt to obtain the maximum power from each of the power sources under any given operating conditions.

Figure 2:
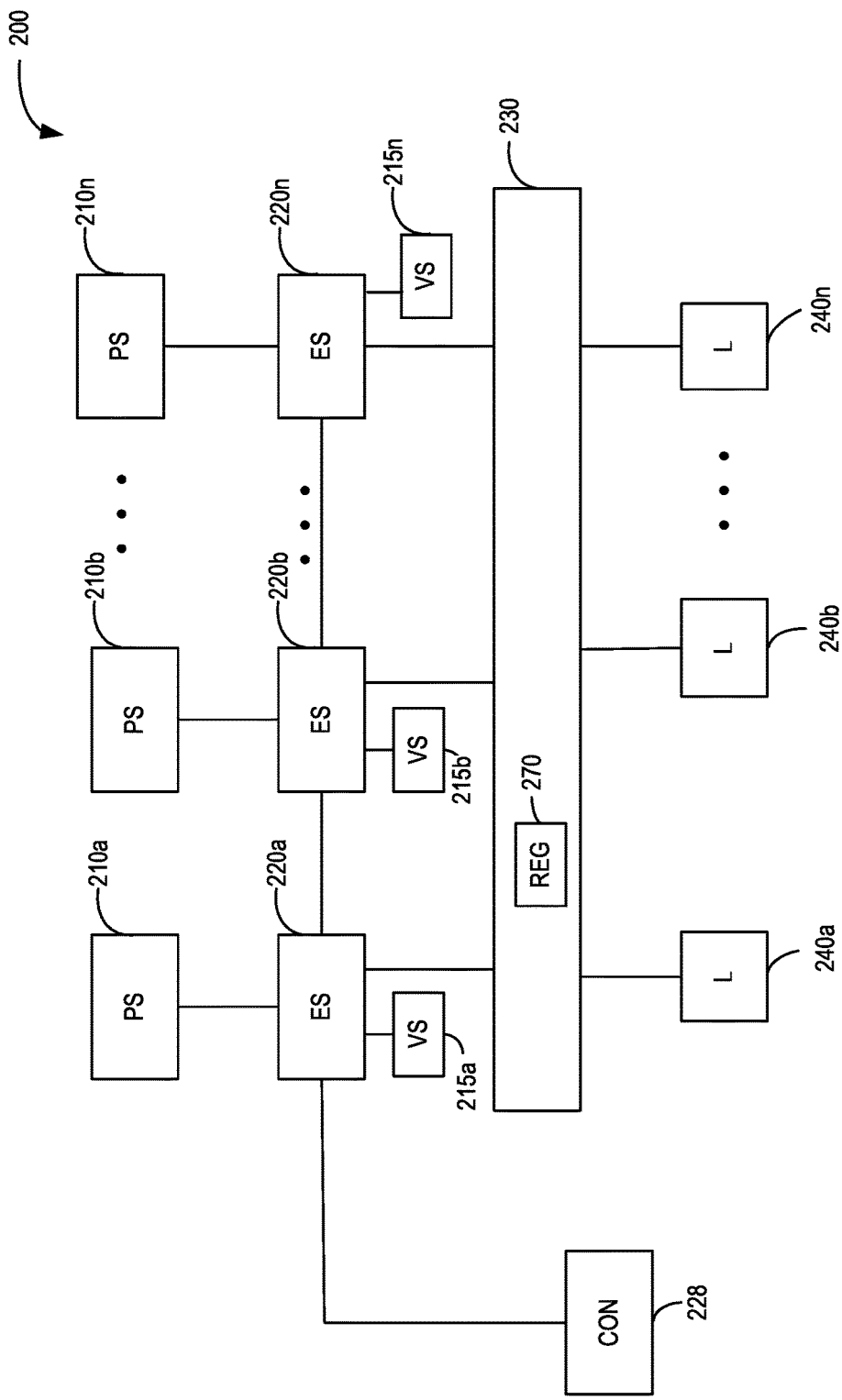
FIG. 2 is an example system for combining electrical power from a plurality of power sources.

Referring now to FIG. 2, there is illustrated an example system for combining electrical power from a plurality of power sources. Power combiner system 200 has a plurality of power sources 210a to 210n, the output of which is electrically couplable to the inputs of respective of energy storage elements 220a to 220n. The output of energy storage elements 220a to 220n is electrically couplable to electrical network 230, which is in turn coupled to electrical loads 240a to 240n.

Each of energy storage elements 220a to 220n is couplable to power sources 210a to 210n under the control of controller 228. For example, controller 228 may transmit signals to input or output switches (not shown), to cause an energy storage element to be coupled to a power source, or to the electrical network 230. In some embodiments, one or more energy storage elements 220a to 220n may be provided with a dedicated controller, which may control the switches of the energy storage element or otherwise enable or disable input to or output from the energy storage element.

Controller 228 is communicatively coupled to energy storage elements 220a to 220n, or their respective input and output switches, to operate the switches and controllably couple and decouple each energy storage element to and from its respective power source, and also to and from the electrical network 230 and ultimately to electrical loads 240a to 240n. Controller 228 is also coupled to voltage sensors 215a to 215n provided at each energy storage element, or its respective switches, to monitor node voltages. In some embodiments, voltage sensors may be replaced with power sensors, current sensors or other sensors.

Controller 228 generally is a computing device with a processor, memory and input/output hardware, such as a serial or parallel communications interface. In some cases, controller 228 may be equipped with a network communications interface for monitoring and control of energy storage elements or their switches. The memory of controller 228 may be volatile or non-volatile, or a combination of both. The memory stores computer-readable and executable program code, which directs the controller 228 to execute one or more control programs as described herein. Generally, controller 228 monitors input from energy storage elements 220a to 220n and uses the input to dynamically determine a respective state of each of the one or more energy storage characteristic of each energy storage element. Examples of states include voltage levels, current levels, power levels and other data about the state of the energy storage element or its respective electrical nodes or network. Based on the respective state of each of the energy storage elements, the controller 228 dynamically determines an output configuration that provides an optimal or maximum power output from each power source, and accordingly dynamically causes at least one output element to be coupled to electrical network 230 (e.g., an output).

Figure 5:
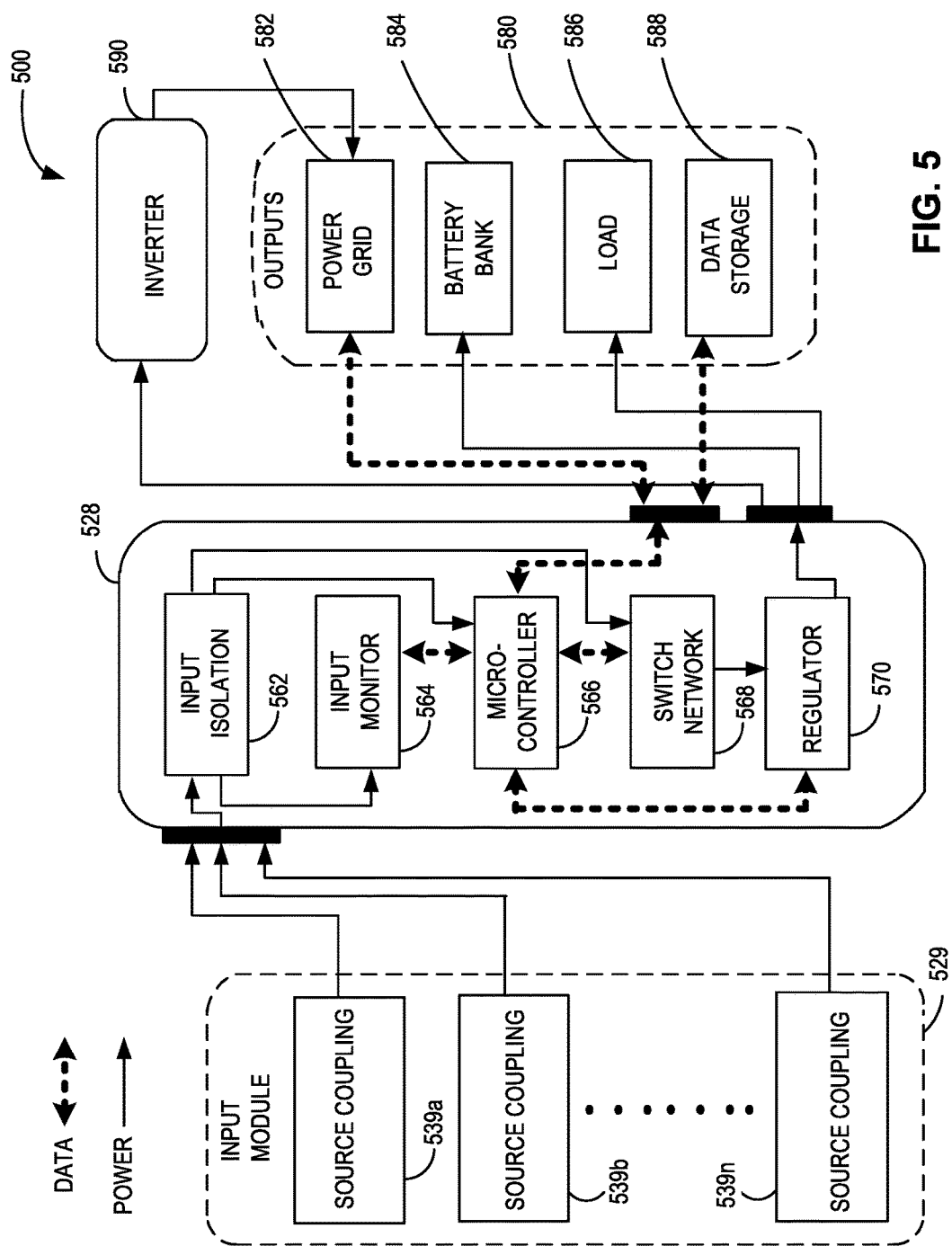
FIG. 5 is a schematic block diagram for an example controller in a power combiner system.

Electrical network 230 may have one or more regulators 270 to condition the outputs to loads 240a to 240n, as described further with reference to FIG. 5. Example regulators 270 include one or more of a power converter, boost converter and an inverter.

Electrical loads may be time-varying, therefore controller 228 is configured to dynamically compute, recompute and reconfigure the energy storage elements to account for fluctuations in voltage and current from each power source 210a to 210n, varying voltages and currents supplied by each energy storage element 220a to 220n and varying loads.

Switching frequencies may be determined according to one or more factors, such as switching losses, current limits, ripple voltages and transistor turn on or turn off times.

Generally, switching losses are proportional to the switching frequency. For this reason, lower switching frequencies may be selected to minimize losses, subject to the other factors described herein.

Current limits imposed by system elements and, in particular, energy storage elements, may provide upper limits on switching frequency. For example, both input current limits and output current limits of each energy storage element may provide a bound on the switching frequency. Input current is the current that flows when the energy storage element is charging. Output current is the current that flows when the energy storage element is discharging.

Input or output current may be measured in various ways such as, for example, introducing a resistive element and measuring voltage drop, or using a Hall Effect sensor. However, resistive elements introduce losses, whereas Hall Effect sensors may not be cost-effective to implement.

In some embodiments, current may be measured in the capacitive elements of energy storage elements (e.g., capacitors) and by monitoring capacitor voltage. The capacitances of the capacitive elements may be determined by using capacitors with known capacitive values, or by using an in-circuit capacitance meter, which operates by using a known voltage and resistance and computes the capacitance based on the capacitor voltage.

Figure 13:
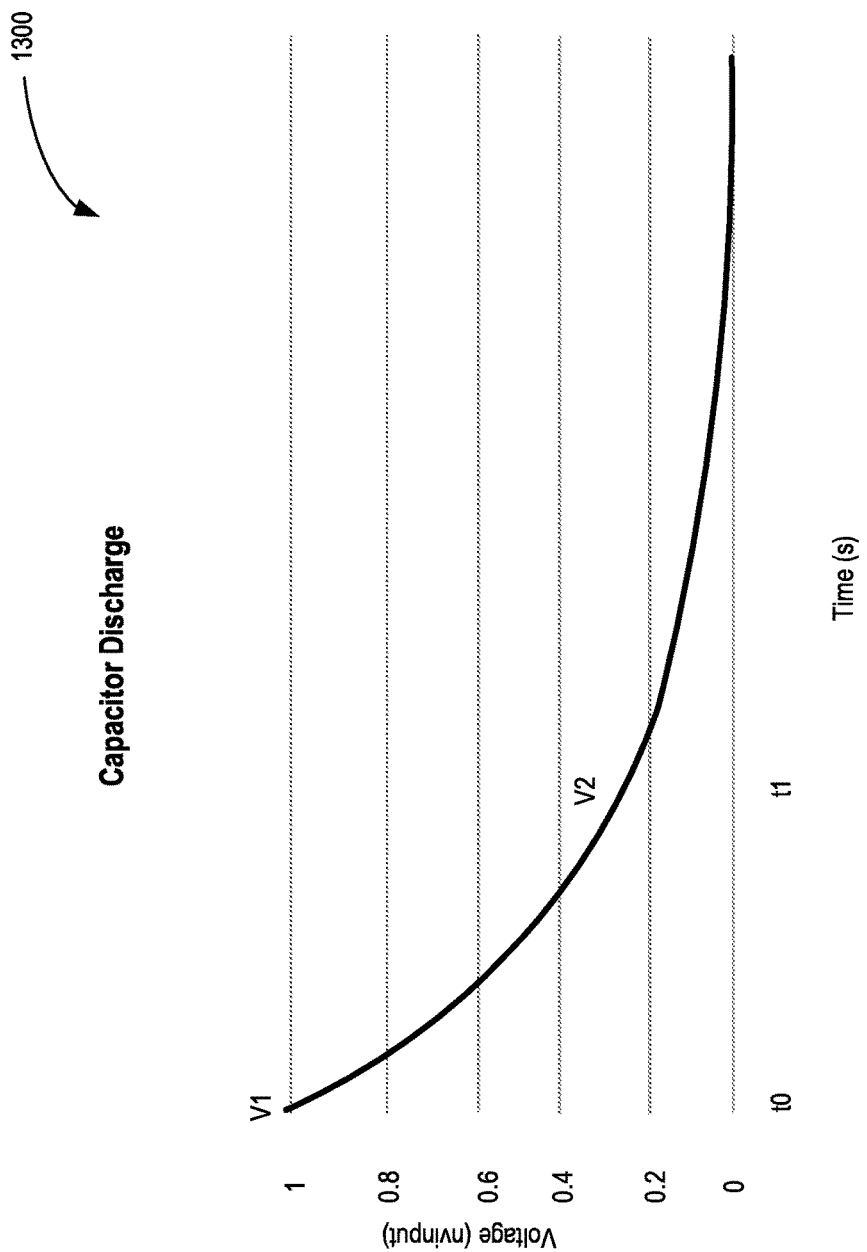
FIG. 13 is an example plot of voltage vs. time for a capacitor discharge.

FIG. 13 illustrates an example plot of voltage vs. time for a capacitor discharge. It can be observed that voltage decays exponentially as a function of time, such that:

$$V_2 = V_1 e^{\frac{-t}{RC}}$$

where $V_1$ is the voltage of the capacitor at time $t_0$, $V_2$ is the voltage of the capacitor at time $t_1$, and R is a known resistance that the capacitor is discharged through. Isolating for the capacitance, C, gives:

$$C = \frac{-t_1}{(\ln V_2 - \ln V_1)R}$$

Once capacitance is known, given only for small changes in voltage $\Delta V$, the current passing through the capacitor can be measured:

$$I = \frac{C}{t_{measure}} \cdot \Delta V$$

where $t_{measure}$ is the time in between voltage measurements of the capacitor.

Figure 10:
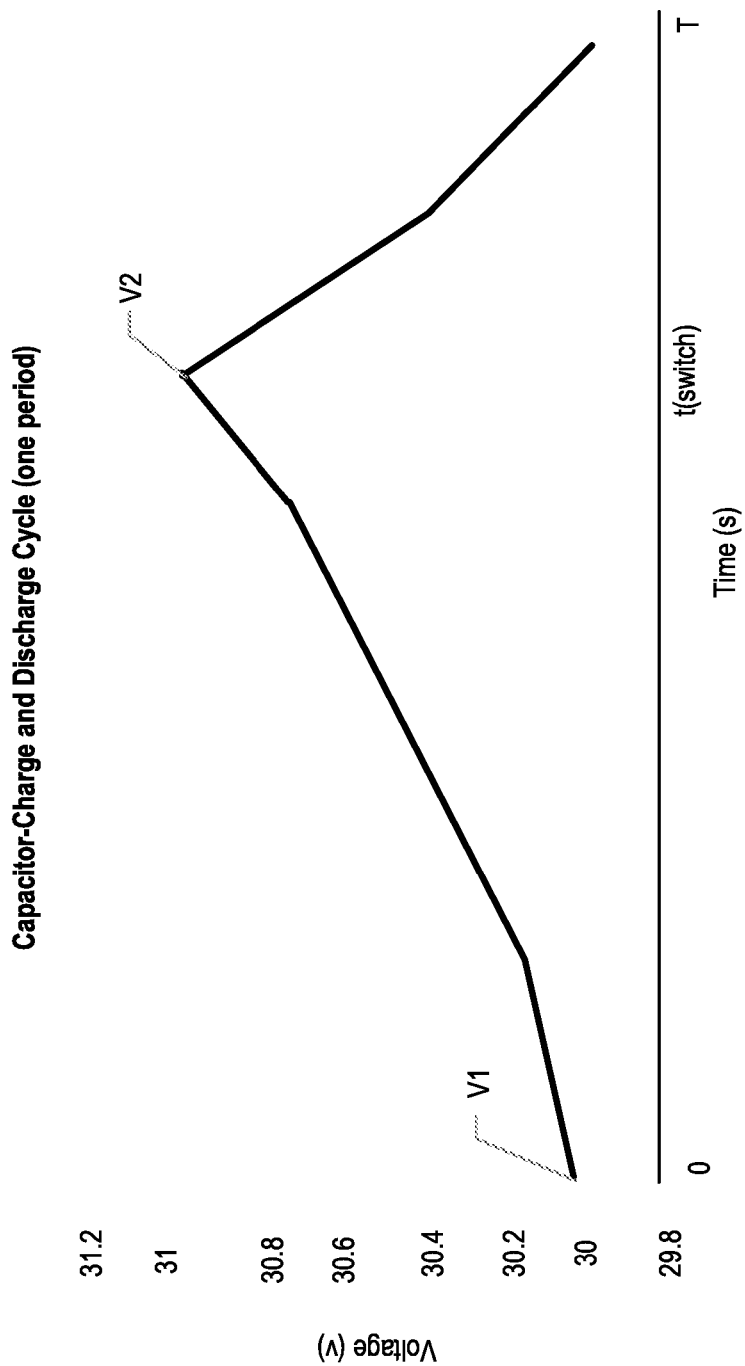
FIG. 10 is an example plot of capacitor voltage during a charge and discharge cycle.

Referring now to FIG. 10, there is illustrated an example plot of capacitor voltage during a charge and discharge cycle. The energy in the capacitor is a function of the voltage and can be determined according to the formula:

$$E(V) = \frac{CV^2}{2}$$

where E is the total energy stored in Joules, C is the capacitance of the capacitor in Farads, and V is the measured voltage in Volts.

As shown in FIG. 10, $V_1$ is the voltage at the beginning and end of the period T. $V_2$ is the peak voltage that is reached before the capacitor is switched, and begins to discharge at t(switch). The power discharged by the capacitor during the discharge cycle can be computed by determining the difference in energies $E(V_1)$ and $E(V_2)$ over the discharge time:

$$t_{discharge} = T - t(\text{switch})$$

$$P_{discharge} \approx \frac{E(V_2) - E(V_1)}{t_{discharge}}$$

Average voltage can be determined from $V_1$ and $V_2$ in order to compute the output current:

$$V_{avg} \approx \frac{V_1 + V_2}{2}$$

$$I_{out} = \frac{P_{discharge}}{V_{avg}}$$

Generally, the ripple current rating of a capacitor used as an energy storage element should be larger than $I_{out}$. Ripple current can be determined from the ripple voltage (e.g., ($V_2 - V_1$), which may be small), and knowledge of the discharged power.

For small changes in voltage (e.g., in the millivolt range, or less than 1 volt), decreasing the discharge time $t_{discharge}$ will cause a corresponding increase in the output ripple current $I_{out}$.

A lower bound on the period, T, can be determined as follows:

$$T_{lower} = 2n \cdot t_{discharge}$$

where n is the number of input power sources.

Once $I_{out}$ and $t_{discharge}$ are optimized based on the ripple current rating of the capacitor or energy storage element, the upper limit of the switching frequency can be found according to the known formula:

$$f_{upper} = \frac{1}{T_{lower}}$$

Ripple voltage limits imposed by system elements are also considered, since these will set a lower limit of the switching frequency. Generally, a small ripple voltage is preferred:

$$V_{ripple} = V_2 - V_1$$

Charging time is computed:

$$t_{charge} = T - t_{discharge}$$

Charging power is computed and is approximately equal to the maximum power point power of the input source:

$$P_{charge} \approx \frac{E(V_2) - E(V_1)}{t_{charge}}$$

$$P_{charge} \approx P_{MPP}$$

which leads to the combined equation:

$$\frac{CV_2^2}{2} - \frac{CV_1^2}{2} \approx P_{charge} \cdot t_{charge}$$

Since the capacitance, C, of the energy storage elements will be known, $V_1$ and $V_2$ can be determined after selecting a maximum allowable ripple voltage, $V_{ripplemax}$:

$$V_1 = V_{MPP} - \frac{V_{ripplemax}}{2}$$

$$V_2 = V_{MPP} + \frac{V_{ripplemax}}{2}$$

where $V_{MPP}$ is the voltage at the maximum power point of the input power source.

An upper bound on the period can be solved for as follows, to determine a lower limit of the switching frequency:

$$T_{upper} = \frac{2n \cdot t_{charge}}{2n - 1}$$

$$f_{lower} = \frac{1}{T_{upper}}$$

Transistor turn on and turn off time can also be considered, since transistors and other switching elements do not turn on or off instantaneously. Therefore frequency can be selected such that transistor dead times do not take up more than a pre-selected percentage of the period, T. For example, in an example 2 kW power combiner system, the dead time may be limited to less than 1% of the period.

Dead time may be computed as follows:

$$t_{DT} = t_{n+1[on]} - t_{n[off]}$$

$$t_{DT[total]} = 2n \cdot t_{DT}$$

where $t_{DT[total]}$ is the total dead time and $t_{DT}$ is the maximum consecutive dead time. An upper bound on frequency can be determined by using the relationship with the period as follows:

$$t_{DT} < 0.01 \cdot T$$

It can be observed that the frequency and period are proportional to the number of input sources. Therefore, as power sources are added to a power combiner system, larger capacitors or higher switching frequencies may be used, leading to higher ripple voltages and currents at any given frequency.

In some embodiments, controller 228 may have a sampling frequency in the range between 1-100 kHz, depending on the maximum frequency of the controller sampling inputs or the analog-digital converter, while the controller 228 itself may have any suitable operating frequency, e.g., in the 1 to 1000 MHz range, again depending on the available clock frequency.

Figure 3A:
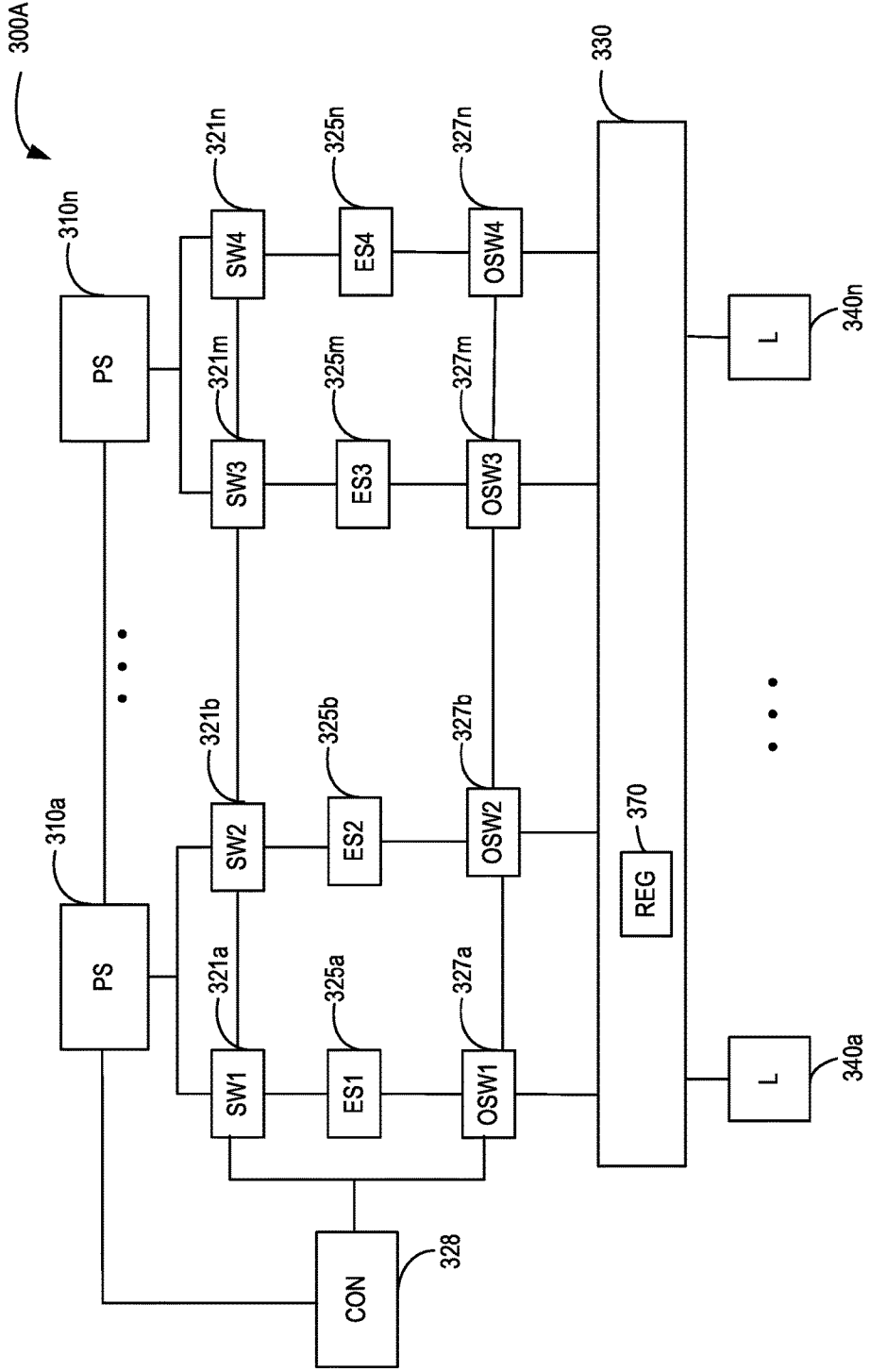
FIG. 3A is another example system for combining electrical power from a plurality of power sources.

Referring now to FIG. 3A, there is illustrated another example system for combining electrical power from a plurality of power sources. Power combiner system 300A is an example embodiment of system 200 of FIG. 2, and therefore has a plurality of power sources 310a to 310n, the output of which is electrically couplable to the inputs of respective of energy storage elements 320a to 320n. When an input switch between a power source and an energy storage element is closed the energy storage element will be charged by the corresponding power source.

The output of energy storage elements 320a to 320n is electrically couplable to electrical network 330, which is in turn coupled to electrical loads 340a to 340n. In some cases, electrical network 330 may be an electrical network having multiple nodes, links and switches, such as an electrical power grid. In other cases, electrical network 330 may be a simple circuit, or even a single electrically-conductive wire.

In some embodiments, electrical network 330, or one or more electrical loads 340a to 340n, may be configured as dynamically changing loads (dynamic loads) that are isolated by, e.g., a time division scheme, in order to allow all input power sources to operate at their maximum power point. In particular, the dynamically changing loads may change their effective impedance, e.g., under the control of controller 328, to match the voltage-current characteristic of the power source and energy storage element that is currently coupled to electrical network 330 and thereby automatically cause the power sources to operate at their maximum power point.

In some embodiments, the dynamic load may be implemented using a DC-DC converter, such as a boost converter. Controller 328 can automatically control the DC-DC converter at a frequency higher than the switching frequency of system 300A (e.g., at least twice as high and higher in some cases), to allow the DC-DC converter to adapt to changes in the power source or energy storage element coupling. Moreover, use of a DC-DC converter at the output of system 300A can allow for a fixed DC voltage output.

Each of energy storage elements 320a to 320n is couplable to power sources 310a to 310n under the control of controller 328. For example, controller 328 may transmit signals to input switches 321a to 321n, or to output switches 327a to 327n, or both, to cause an energy storage element to be coupled to a power source, or to the electrical network 330. Input switches 321a to 321n and output switches 327a to 327n may be collectively referred to as the switch network.

Controller 328 is communicatively coupled to energy storage elements 320a to 320n, or to the respective input switches 321a to 321n and output switches 327a to 327n, to operate the switches of the switch network and thereby controllably couple and decouple each energy storage element to and from its respective power source, and also to and from the electrical network 330 and ultimately to electrical loads 340a to 340n.

Input switches 321a to 321n, along with output switches 327a to 327n can be, in some examples, transistors or power transistors, such as MOSFETs. Examples of suitable transistors include, but are not limited to, IRF3205 N-channel power MOSFETs manufactured by International Rectifier of El Segundo, Calif. The IRF3205 transistors are capable of driving up to 110 amps, are rated for operation at up to 55 volts, and can dissipate a maximum of 200 watts. Other suitable transistors for higher power applications include integrated gate bipolar junction transistors. Other switching devices may also be used in some embodiments, such as relays and bipolar junction transistors, although timing may be slowed to account for slower switching speeds, thereby impacting performance.

Depending on the type of switch device used, there may be restrictions on the operation of the switch network. For example, when MOSFET transistors are used, timing may be configured so that no current is conducted between energy storage elements across different input power sources. In such cases, controller 328 can be configured to ensure that each energy storage element is isolated, for example through use of a guard period when switching.

Figure 11:
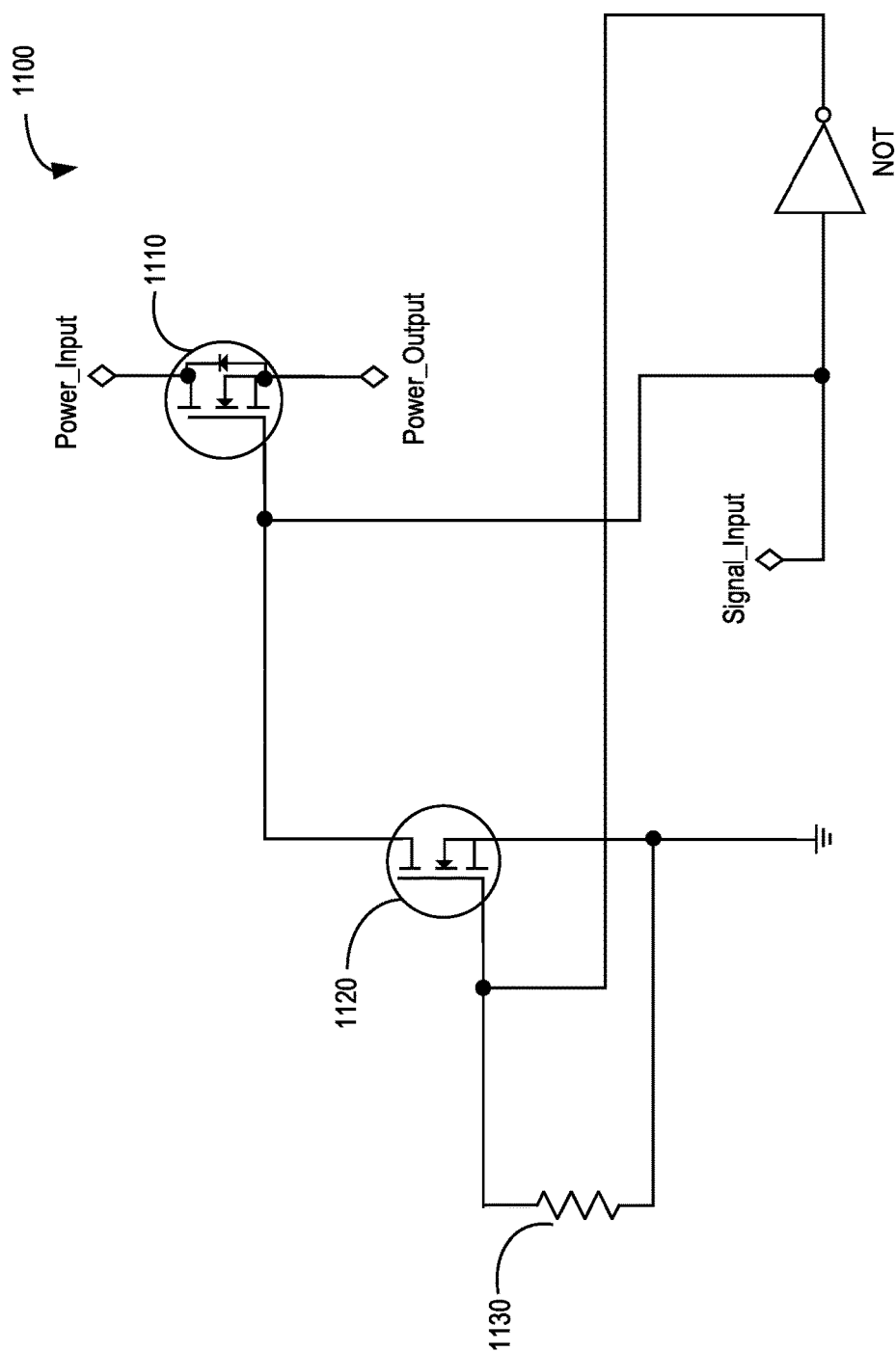
FIG. 11 is a circuit diagram of an example pull down circuit.

In some embodiments, pulldown transistors may be used. For example, low power, N-channel signal MOSFETs may be used to quickly pull down the gate of the main power MOSFET to ground, as illustrated in the example circuit 1100 of FIG. 11. Use of a pull down transistor compensates for the fact that, when it is desired to turn the power transistor off, its gate does not instantly drop to zero volts, due to a relatively large gate capacitance on higher power MOSFETs. A pull down transistor 1120 can be used at the gate of power transistor 1110 in order to quickly turn the power transistor 1110 off (by pulling it to ground). The pull down transistor 1120 may receive an inverted signal to the main power MOSFET. Examples of a suitable pull down transistor include, but are not limited to, a 2N7000 MOSFET.

In some cases, a pull down resistor can be used instead of a pull down transistor, or in addition to a pull down transistor (e.g., connected to the gate of a pull down transistor). In example circuit 1100, a pull down resistor 1130 is used at the gate of the pull down transistor 1120.

In some cases, switching of transistors may be aided with gate driver circuits, particularly in the case of high side switching. High side switching refers to the switching of transistors that are passing currents when the source voltage is not at ground (e.g., zero volts). With MOSFET power transistors, switching requires a gate-source voltage of at least about 10 volts to turn the transistor fully on (e.g., if the source voltage is 40 volts, a gate voltage of 50 volts is applied to turn the transistor fully on). Prior to being turned fully on, the transistor may be conducting, although with a high impedance.

Figure 12A:
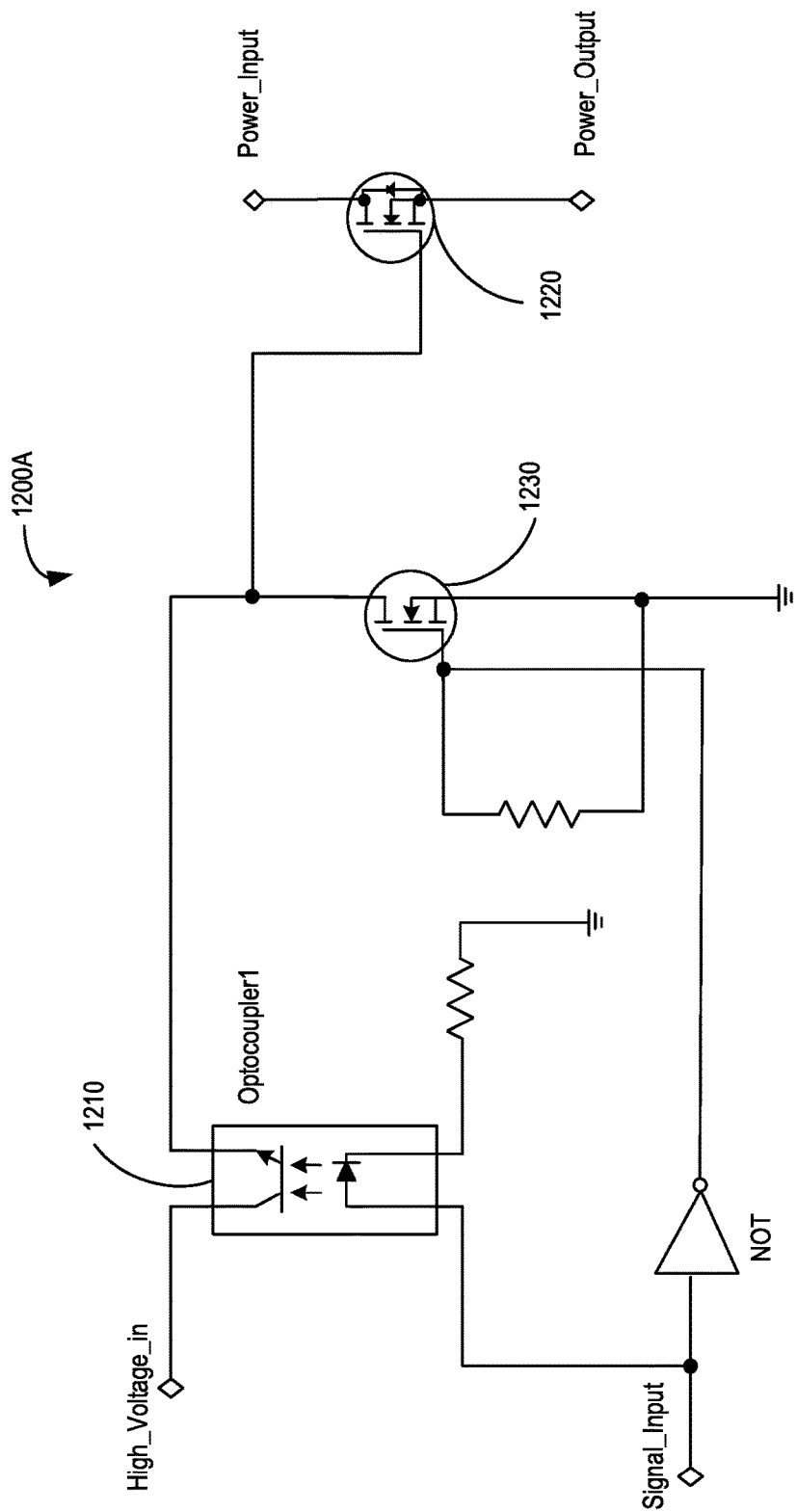
FIG. 12A is a circuit diagram of an example optocoupler-based gate driver circuit.

In some embodiments, an optocoupler can be used to couple high voltage switches with low voltage switches to facilitate high side switching. The high voltage switches can thereby be controlled by switching with low voltages. An example optocoupler driver circuit is illustrated in FIG. 12A, and has an optocoupler 1210, a pull down transistor 1230 and a power transistor 1220. The optocoupler is driven by a signal input, which allows coupling of a high voltage input to the power transistor 1220 or pull down transistor 1230, where the high voltage input is sufficient to drive the power transistor 1220. As can be seen, the pull down transistor 1230 is controlled by an inverted signal input.

One example optocoupler that may be used is the LTV 846 manufactured by Lite-On Electronics, Inc., which can switch at frequencies up to 80 kHz. The low voltage side of the optocoupler can be controlled by a processor, such as a processor of controller 428.

Figure 12B:
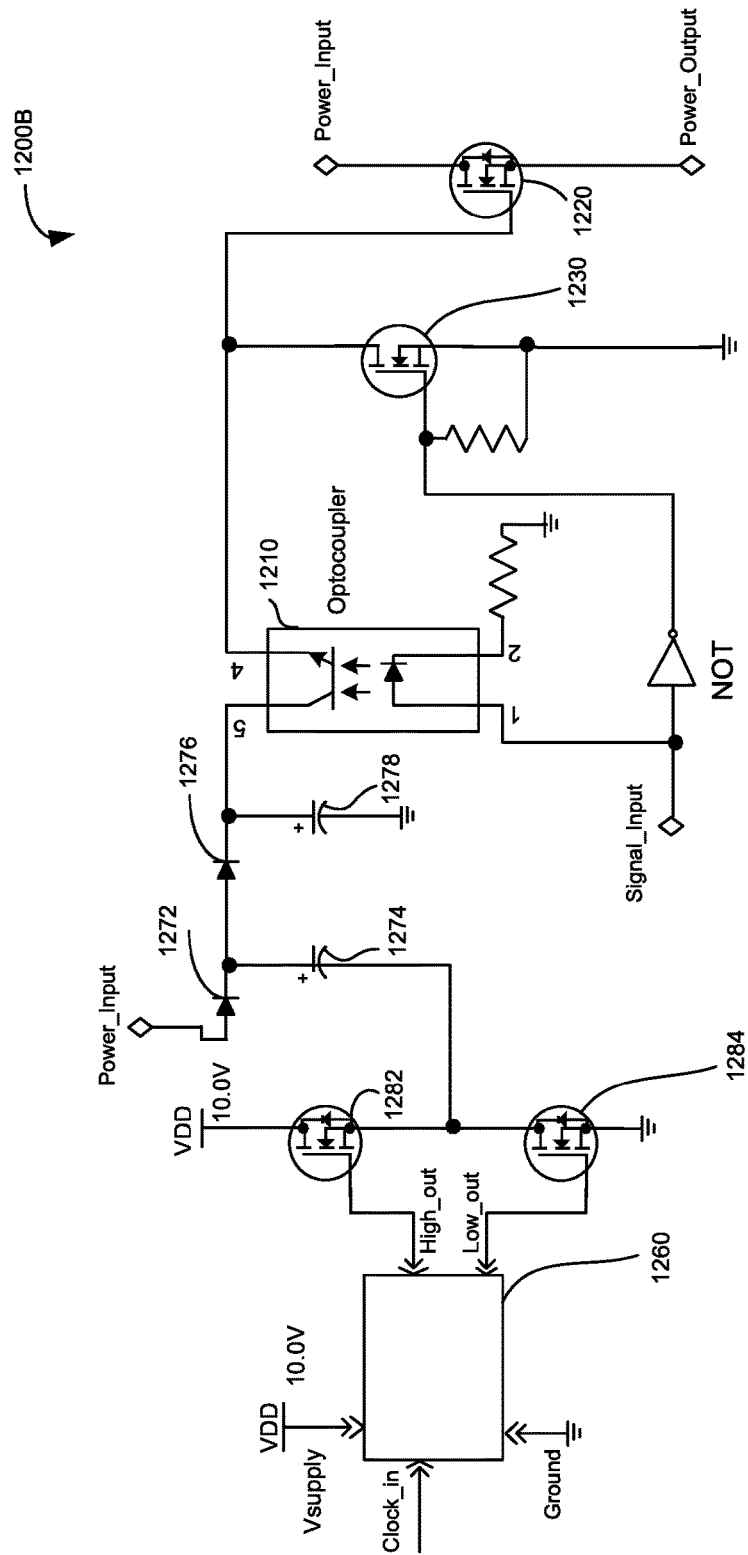
FIG. 12B is a circuit diagram of an example optocoupler-based gate driver circuit with a charge pump.

The high voltage input to the optocoupler can be produced, for example, by a charge pump, which may be a DC-DC converter that steps up voltages. In one example gate driver configuration as illustrated in FIG. 12B, the input to the charge pump may be the same as the drain voltage of the main power MOSFET. Each stage of the charge pump has a diode 1272 and a capacitor 1274 (or diode 1276 and capacitor 1278) that can add a voltage equal to Vdd (e.g., 10 V) to the gate driver circuit input. The charge pump can be driven by two MOSFETS 1282 and 1284 in a synchronous half bridge (e.g., transistors 1282 and 1284 receive inverted gate signals). The charge pump may be driven by a suitable driver 1260, such as the ADP3120A dual bootstrapped MOSFET driver manufactured by ON Semiconductor. An example power combiner system with an optocoupler is described with reference to FIG. 6.

The gate driver circuit 1200A can be duplicated for each of the high side transistors in a power combiner system. Components such as the charge pump can be shared between gate driver circuits 1200A or 1200B, however at least one charge pump per input power source can be provided.

In some embodiments, a dedicated gate driver integrated circuit can be used to drive the high side transistor gates, but this may necessitate multiple gate drivers, increasing cost.

Figure 14:
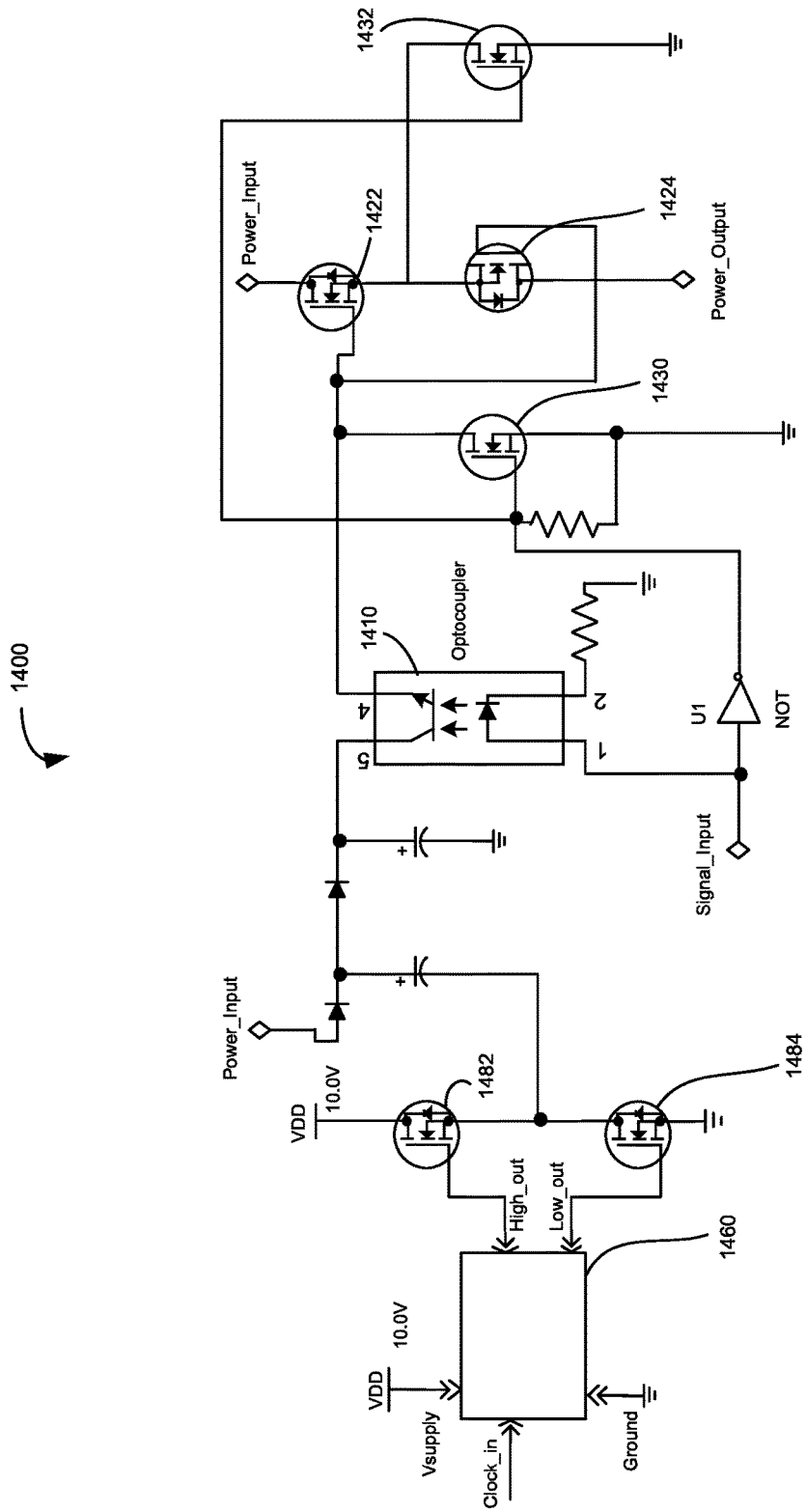
FIG. 14 is a circuit diagram of another example optocoupler-based gate driver circuit with a charge pump.

In some embodiments, a switching circuit may employ source-to-source transistors to reduce or eliminate leakage current while in the off state. Referring now to FIG. 14, there is illustrated another example gate driver circuit 1400. Gate driver circuit is analogous to gate driver circuit 1200B, but replaces power transistor 1220 with source-to-source connected MOSFETs 1422 and 1424.

In their off state, MOSFETs may leak a small amount of current. However, to fully isolate inputs in system 200, small leakages may be prevented by arranging two power transistors source to source.

In the circuit 1400, transistor 1424 protects against leakage current. The gate of transistor 1424 is pulled down by the same pull down transistor as transistor 1422. The connected sources of transistors 1422 and 1424 can be to be pulled down to ground by pull down transistor 1432, to ensure that any small leakage current between the MOSFETs is pulled to ground.

Alternatively, in some embodiments, a power transistor may have a diode placed in series with the source of the MOSFET to prevent leakage current. However, the diode has a forward voltage drop which may reduce efficiency.

Energy storage elements 320a to 320n can be, in some examples, capacitors. In some embodiments, energy storage elements may be aluminum electrolytic capacitors (e.g., 10 mF 50V capacitor SLPX103M050E7P3 manufactured by Cornell Dubilier Electronics, which is rated for ripple currents of up to 5.08 A). Aluminum electrolytics are a good option because they have large capacitances at relatively high voltages. In some cases, energy storage elements can be connected in parallel to double the ripple current and capacitance, or connected in series to double the rated voltage.

Large capacitance leads to lower switching frequencies, which in turn leads to lower switching losses. However, higher capacitances generally use larger-sized capacitors that are typically rated at lower voltages, cost more, and take up more space.

Other electrical energy storage elements may be used, but for efficient and cost effective operation (e.g., at 2 kW) capacitors can be used.

Controller 328 generally is a computing device with a processor, memory and input/output hardware, such as a serial or parallel communications interface. In some cases, controller 328 may be equipped with a network communications interface for monitoring and control of energy storage elements or their switches. The memory of controller 328 may be volatile or non-volatile, or a combination of both. The memory stores computer-readable and executable program code, which directs the controller 328 to execute one or more control programs as described herein.

Generally, controller 328 monitors voltages from voltage sensors (not shown) at each of input switches 321a to 321n and output switches 327a to 327n and uses the input to dynamically determine a respective state of each of the one or more energy storage characteristic of each energy storage element, as described herein. In some embodiments, controller 328 may directly monitor inputs from energy storage elements, where such data signals are available.

Figure 9:
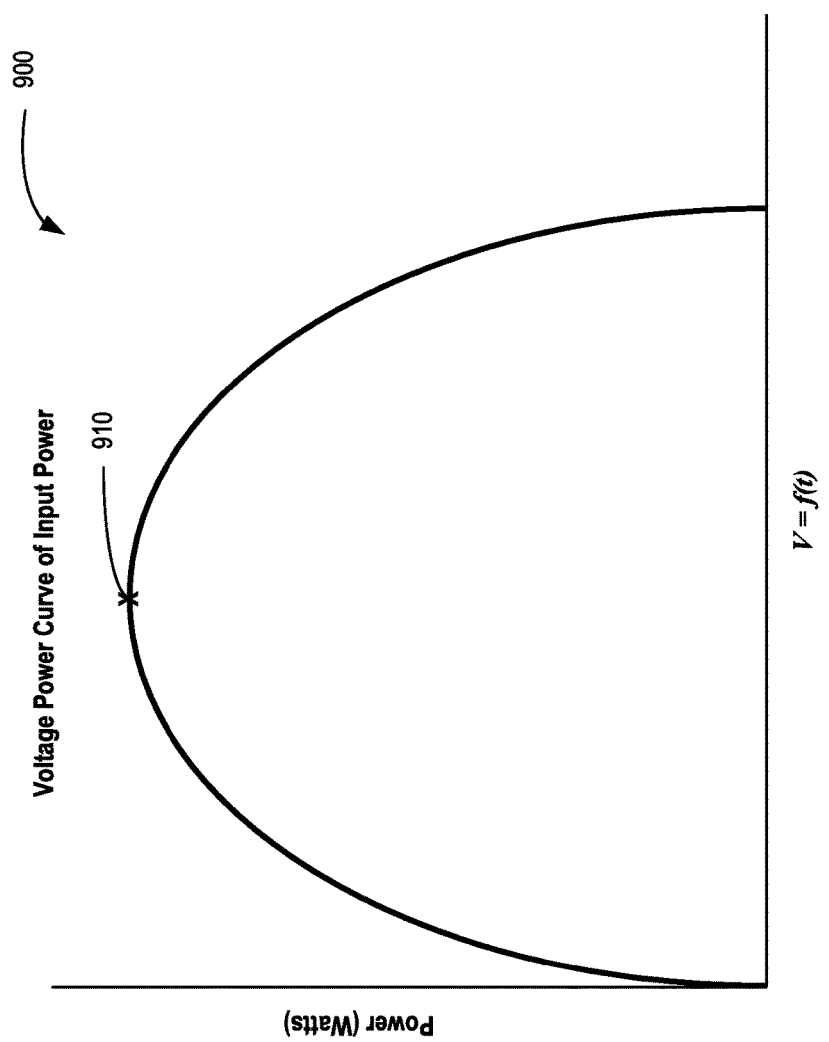
FIG. 9 is an example plot of power versus voltage over time for input power source.

In embodiments where the energy storage elements are capacitors, or include a capacitor as an energy store, the state can include, but is not limited to, the energy stored in the capacitor. As noted above, energy in capacitors can be determined by measuring voltage across the capacitor and determining an energy level according to the formula:

$$E = \frac{CV^2}{2}$$

where E is the total energy stored in Joules, C is the capacitance of the capacitor in Farads, and V is the measured voltage in Volts. The change in energy stored in a capacitor over time can be used to determine the output power of the power source. This characteristic can in turn be used by controller 328 to determine the maximum power point of the power source, because as the voltage across the capacitor changes, the rate of charge will also change as illustrated in FIG. 9.

Once the maximum power point of each power source is determined, controller 328 can automatically select which of the energy storage elements 320a to 320n to be coupled to the electrical network 330. In some embodiments, controller 328 can select the energy storage element for coupling in such a manner as to maintain the voltage of each energy storage element at the voltage that provides for the maximum power point of its respective input power source.

Based on the respective state of each of the energy storage elements, the controller 328 dynamically determines an output configuration that provides an optimal or maximum power output from each power source, and accordingly dynamically causes at least one output element to be coupled to electrical network 330 (e.g., an output).

Electrical network 330 may have one or more regulators 370 to condition the outputs to loads 340a to 340n, as described further with reference to FIG. 5. Example regulators 370 include one or more of a power converter, boost converter and an inverter.

Electrical loads may be time-varying, therefore controller 328 is configured to dynamically monitor, compute, recompute and reconfigure the energy storage elements to account for fluctuations in voltage and current from each power source 310a to 310n, varying voltages and currents supplied by each energy storage element 320a to 320n and varying loads. In some embodiments, controller 328 may have a sampling frequency in the range between 1-100 kHz, while the controller 328 itself may have any suitable operating frequency, e.g., in the 1 to 1000 MHz range, depending on the controller sampling frequency and operating frequency.

Generally, controller 328 determines the charge rate of the energy storage elements, for example by monitoring the amount of energy stored in the energy storage elements over time. The maximum power point of each power source 310a to 310n can be determined by searching for the voltage that produces the highest charge rate for each of the energy storage elements in a respective set. The search can be optimized by limiting the search space within the tolerances of the energy storage elements and the switching network, along with the maximum and minimum desired output power, voltage or current.

Figure 7:
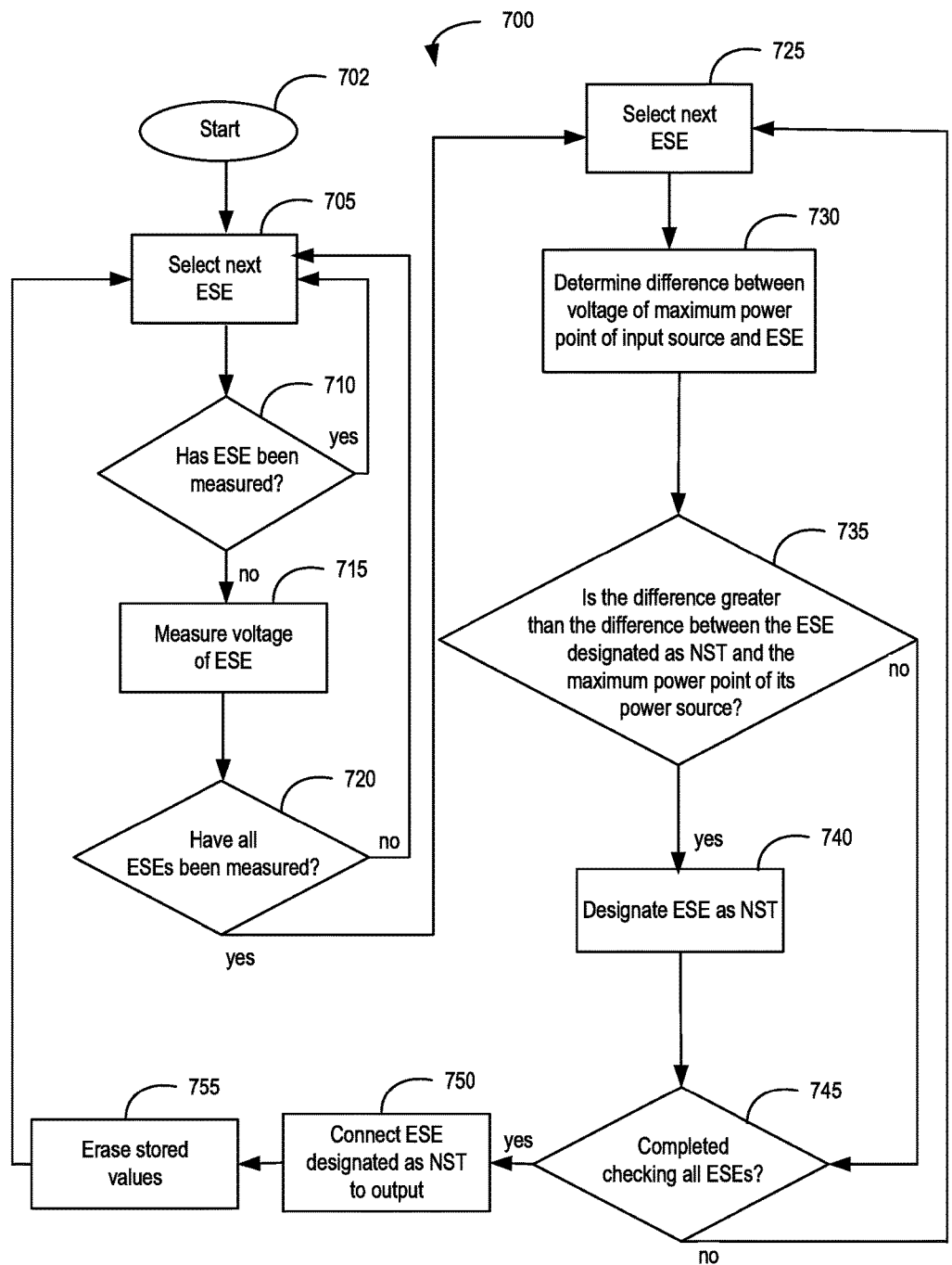
FIG. 7 is a process flow diagram for an example control method.

Referring now to FIG. 7, there is illustrated an example control method in accordance with some embodiments. Control method 700 may be carried out periodically at a suitable operating frequency, for example, by controller 328 of system 300A.

Control method 700 begins at 702 with a system 300A in operation. At 705, controller 328 selects a next energy storage element to be measured from the plurality of energy storage elements 325*a* to 325*n*. If no energy storage element has yet been measured, controller 328 selects a first energy storage element to be measured.

At 710, controller 328 determines if the voltage of the currently selected energy storage element has been measured within a current measurement window. If yes, controller 328 returns to 705 to select a next energy storage element. If not, a voltage measurement may be obtained at 715.

If there are further energy storage elements to be measured, controller 328 may return to 705 at decision triangle 720. If all energy storage elements have been measured in the current measurement window, controller 328 proceeds to 725 to begin determining the differences between the measured energy storage element voltage and the maximum power points of their respective power sources.

At 725, controller 328 selects a next energy storage element to be analyzed from the plurality of energy storage elements 325*a* to 325*n*. If no energy storage element has yet been analyzed, controller 328 selects a first energy storage element to be analyzed.

Controller 328 determines the difference between the voltage of the selected energy storage element and the voltage provided by the respective power source at its maximum power point (as computed by controller 328 over time). For example, if the currently selected energy storage element is energy storage element 325*m*, controller 328 computes the difference between the measured voltage at energy storage element 325*m* and the voltage provided by power source 310*n* at its maximum power point.

At 735, controller 328 determines whether the computed difference is greater than the difference computed for an energy storage element designated as "NST," indicating that it is the next storage element to be coupled to electrical network 330. If the difference is greater, then the currently selected energy storage element is designated as "NST" instead at 740. Otherwise, controller 328 proceeds to 745 to determine whether there are additional energy storage elements to analyze, and can proceed to 725 if so.

Once there are no further energy storage elements to be analyzed, controller 328 can operate the switch network at 750 as described herein to connect the energy storage element designated as NST to the electrical network 330.

Optionally, controller 328 can erase any stored measurements at 755.

Controller 328 can then proceed to 705 to begin a new measurement window.

In some embodiments, controller 328 may be configured to enforce a minimum or maximum output power when selecting energy storage elements to be connected to the output.

Referring again to FIG. 3A, it is seen that each power source has at least two energy storage elements associated therewith in an energy storage element set. In some cases, more than two energy storage elements may be provided in the energy storage element set.

Each energy storage element has a corresponding input switch connecting it to its power source, and an output switch connecting it to the electrical network or outputs. For example, energy storage element 325*a* has an input switch 321*a* for connection to power source 310*a*, and an output switch 327*a* for connection to electrical network 330. By operating the switch network, controller 328 can disconnect any one or more of the energy storage elements from its respective power source and connect it to the electrical network 330. For example, by closing switch 321*a* and opening switch 327*a*, energy storage element 325*a* may be connected to power source 310*a* in order to charge, while being decoupled from electrical network 330. Correspondingly, input switch 321*b* can be opened and output switch 327*b* may be closed, to couple energy storage element 325*b* to electrical network 330 and thereby provide stored power. In this way, power source 310*a* can provide power to at least one of the energy storage elements in the set (i.e., energy storage element 325*a* and 325*b*), while the other of the storage elements may be providing power to electrical network 330. By modulating the output of energy storage elements 325*a* and 325*b*, an efficient power transfer can be achieved.

In some embodiments, input switches can be controlled in such a way that the inputs for each energy storage element in a given set are isolated from one another in a form of time division multiplexing. Likewise, output switches can be controlled in similar fashion.

In some embodiments, only one selected energy storage element from the plurality of energy storage elements 325*a* to 325*n* will be connected to electrical network 330 at any given time. Therefore, while the selected energy storage element is connected to the electrical network 330, the power source may continue to charge the other energy storage element or elements in the respective set that contains the selected energy storage element. Moreover, all energy storage elements in other sets may also continue to be charged by their respective power sources.

For example, if energy storage element 325*b* is selected, then input switch 321*b* may be opened, input switches 321*a*, 321*m* and 321*n* may be closed, output switch 327*b* may be closed, and output switches 327*a*, 327*m* and 327*n* may be opened.

In some other embodiments, where there is more than one energy storage element set, multiple energy storage elements—generally one per set—may be coupled to electrical network 330 at a time (and decoupled from their respective power sources). This may be done, for example, to smooth variances in the voltage of electrical network 330.

Figure 3B:
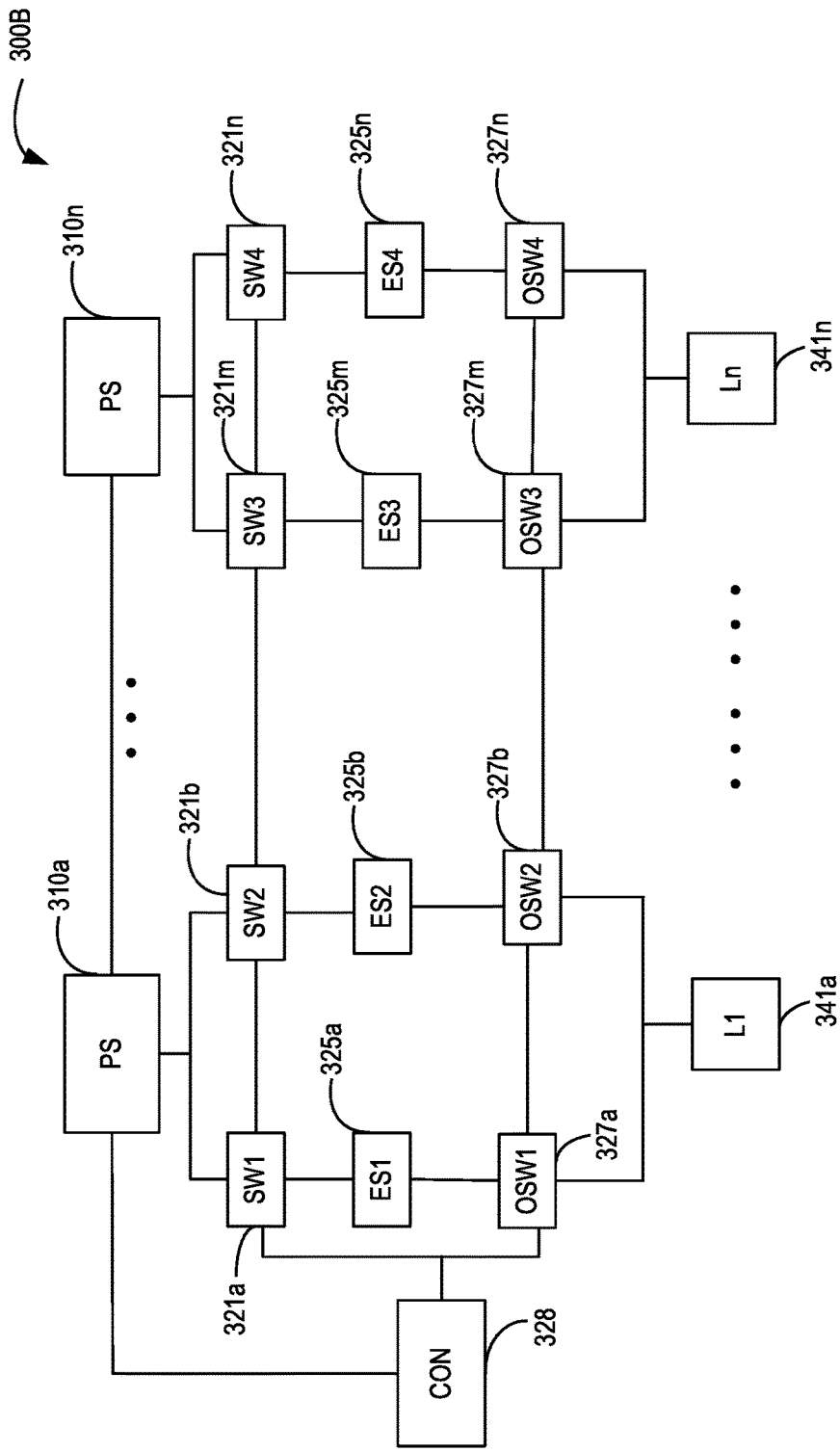
FIG. 3B is another example system for combining electrical power from a plurality of power sources.

Referring now to FIG. 3B, there is illustrated another example system for combining electrical power from a plurality of power sources. Power combiner system 300B is analogous to power combiner system 300A of FIG. 3A, and like numbered elements of system 300B are therefore analogous to the corresponding elements of system 300A.

Unlike in system 300A, system 300B has a plurality of output electrical loads 341*a* to 341*n*, which are directly connected to output switches 327*a* to 327*n*. Each electrical load 341*a* to 341*n* is independent of the other, allowing for a plurality of output voltages to be provided by controller 328. In some embodiments, more than one power source may supply one or more of the electrical loads.

Each electrical load 341*a* to 341*n* may be an effective load that represents a plurality of devices or electrical networks, although these are not shown so as not to obscure the illustrated embodiments.

Figure 4:
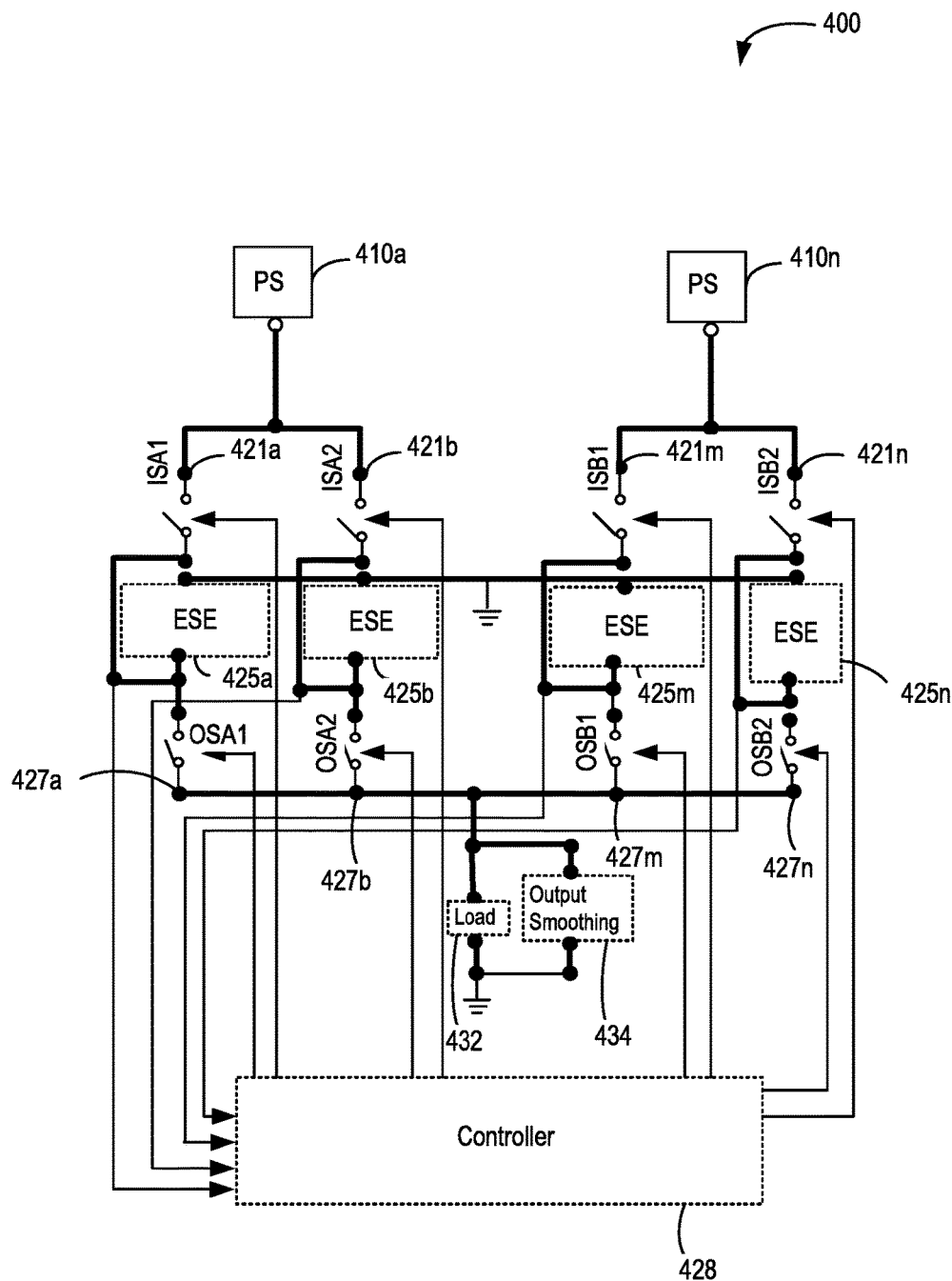
FIG. 4 is another example system for combining electrical power from a plurality of power sources.

Referring now to FIG. 4, there is illustrated yet another example system for combining electrical power from a plurality of power sources. Power combiner system 400 is analogous to power combiner system 300A of FIG. 3A, with elements having numerals that correspond in all but their most significant digits. In FIG. 4, certain elements are illustrated using circuit diagram symbology to aid understanding. In particular, electrical coupling is indicated using thick lines, and with node connections indicated by circles.

Communicative coupling is indicated by thin lines and arrows, and is used to communicate measurements to controller 428 (e.g., from voltage measurement of energy storage elements), and to communicate signals from controller 428 (e.g., to operate input or output switches).

Therefore, power combiner system 400 has power sources 410a to 410n, input switches 421a to 421n, energy storage elements 425a to 425n, output switches 427a to 427n and a controller 428.

A load 432 is shown connected to each of the output switches 427a to 427n. Although shown as a single element, load 432 may also have multiple elements connected in an electrical network, similar to electrical network 330.

Optionally, a load smoothing circuit 434 may be provided.

As with system 300A and 300B, input switches can be controlled in such a way that the inputs for each energy storage element in a given set are isolated from one another in a form of time division multiplexing. Likewise, output switches can be controlled in similar fashion. Outputs from voltage sensors are illustrated as emanating from switches.

In some embodiments, only one selected energy storage element from the plurality of energy storage elements 425a to 425n will be connected to electrical load 432 at any given time. Therefore, while the selected energy storage element is connected to the electrical load 432, the power source may continue to charge the other energy storage element or elements in the respective set that contains the selected energy storage element. Moreover, all energy storage elements in other sets may also continue to be charged by their respective power sources.

For example, if energy storage element 425b is selected, then input switch 421b may be opened, input switches 421a, 421m and 421n may be closed, output switch 427b may be closed, and output switches 427a, 427m and 427n may be opened.

Figure 8:
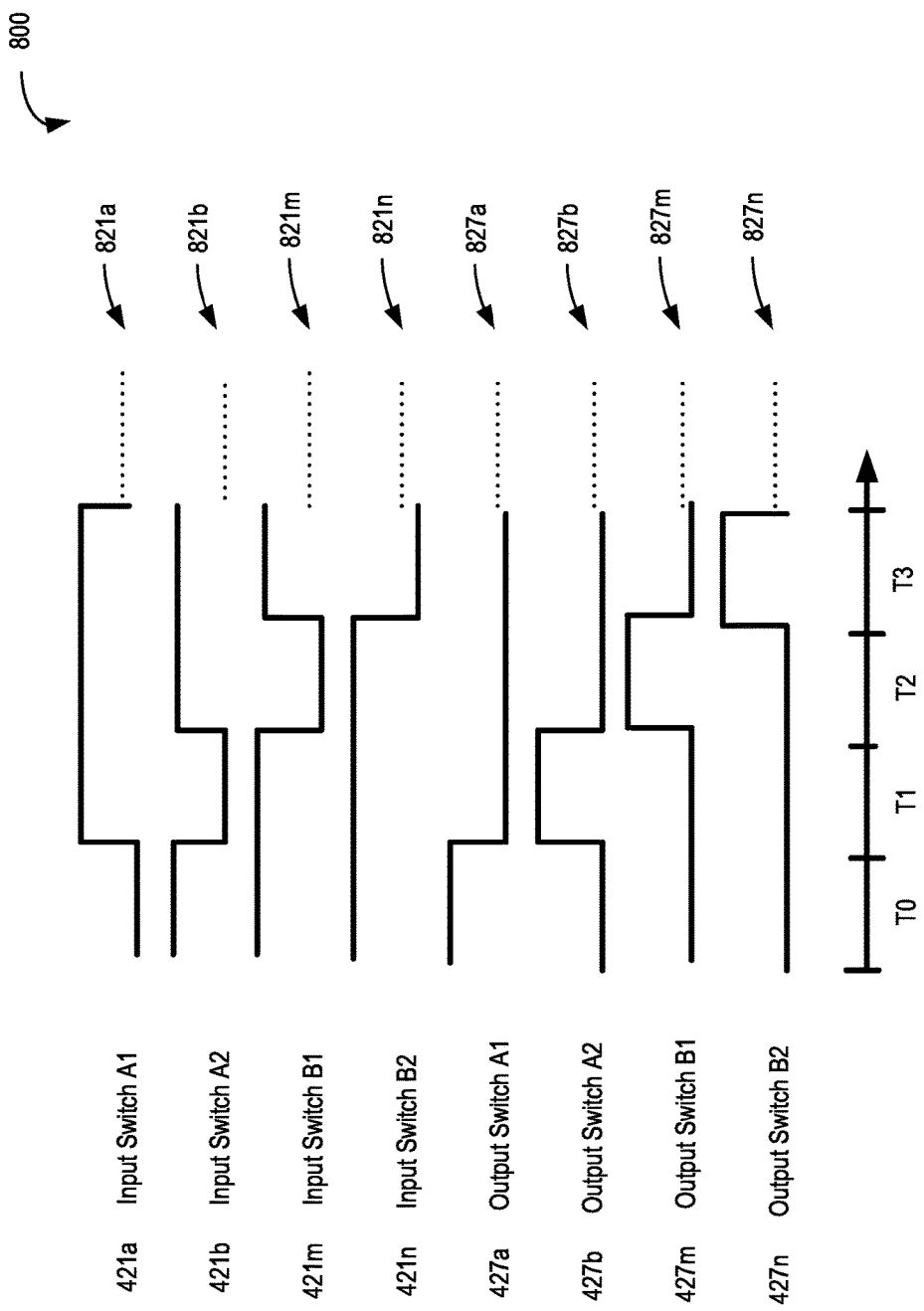
FIG. 8 is a timing diagram for an example switch network from the system of FIG. 4.

Referring now to FIG. 8, there is illustrated an example timing diagram for a sequential progression of outputs from power combiner system 400.

Diagram 800 illustrates eight signal plots 821a, 821b, 821m, 821n, 827a, 827b, 827m and 827n corresponding respectively to each of input switches 421a, 421b, 421m and 421n, and output switches 427a, 427b, 427m and 427n. In this case, a low signal causes the switch to open or stay opened, a high signal causes the switch to close or stay closed.

It can be observed that in period T1, signal 821b for input switch 421b is low, causing the switch to open and cut off the respective power source from charging the corresponding energy storage element. During period T1, signals 821a, 821m and 821n are high, causing the corresponding input switches 421a, 421b and 421n to remain closed and allow the respective energy storage elements to continue charging.

Likewise, during period T1, signal 827b for output switch 427b is high, causing the switch to close and connect to electrical load 432. During period T1, signals 827a, 827m and 827n are low, causing the corresponding output switches 427a, 427b and 427n to remain open to allow the respective energy storage elements to continue charging.

The switching of the wide range power combiner can be controlled simply by cycling through the input sources, sequentially as shown in FIG. 8. However, greater efficiency can be achieved through dynamic switching. Dynamic switching involves switching to a storage element that is at the highest voltage above the voltage at the maximum power point of its input power source. This can be done by monitoring the voltage of the capacitors and discharging the highest voltage as described herein. Likewise, predictive switching can be used, in which the rise time of energy storage elements can be stored and monitored, for example, in data storage 588 as in FIG. 5. Historical data can be used to predict, during the next period, which storage element is most likely to be at the highest voltage allowing for faster, more efficient selection of energy storage elements.

Referring now to FIG. 5, there is illustrated a schematic block diagram for an example controller in a power combiner system.

Controller 528 is analogous to controllers 228, 328 and 428, and is electrically coupled to input module 529, which can include but is not limited to a plurality of source couplings 539a to 539n. Each of the source couplings is connected either to input switches or output switches, which are arranged in similar fashion to system 400. Input module 529 accordingly electrically couples power sources (not shown) and energy storage elements (not shown) to controller 528 and, via switch network 568, to an output electrical network or load as represented by output module 580.

Input isolation module 562 accepts electrical power inputs from input module 529 and can isolate power for monitoring by input monitor 564 and for use by processor 566. Input isolation module also switching unit 568. As shown in FIG. 5, input isolation module 562 also electrically couples switch network 568 to regulator 570 and outputs 580. However, in some embodiments, switch network 568 may be directly coupled with power inputs, for example, as illustrated in FIG. 4.

The isolated power inputs are provided to an input monitor 564, which can measure voltage or power levels and output corresponding data signals to processor 566.

Processor 566 can be a microcontroller or other suitable processor, as described herein, which accepts data signals from input monitor 566, computes control signals to be transmitted in accordance using the described methods, and transmits control signals to switch network 568 and to power converter 570. Processor 566 may also output data signals to power grid 582 to facilitate grid control and updating, and also to data storage 588 for storage in a database or memory.

Switch network 568 has input switches and output switches as described herein (e.g., input switches 321a to 321b and output switches 327a to 327n of FIG. 3A). Based on control signals from processor 566, switch network configures the appropriate input and output switches to route power from energy storage elements (not shown in FIG. 5) to regulator 570.

Regulator 570 can be a power converter, boost converter or other regulator, which accepts power inputs from the current configuration of switches and regulates it to provide a desired voltage or power level. For example, regulator 570 may be a DC-DC converter which converts from one DC voltage to a desired output DC voltage. In some embodiments, more than one regulator 570 may be provided, for example, where there is more than one output load or network with a different desired voltage.

Regulator 570 outputs the converted DC voltage to outputs 580. In the case of DC outputs, such as battery bank 584 or electrical load 586, the regulated output voltage may be supplied directly. In other cases, an inverter 590 may be used to obtain an AC voltage for output to an AC electrical grid 582.

Figure 6:
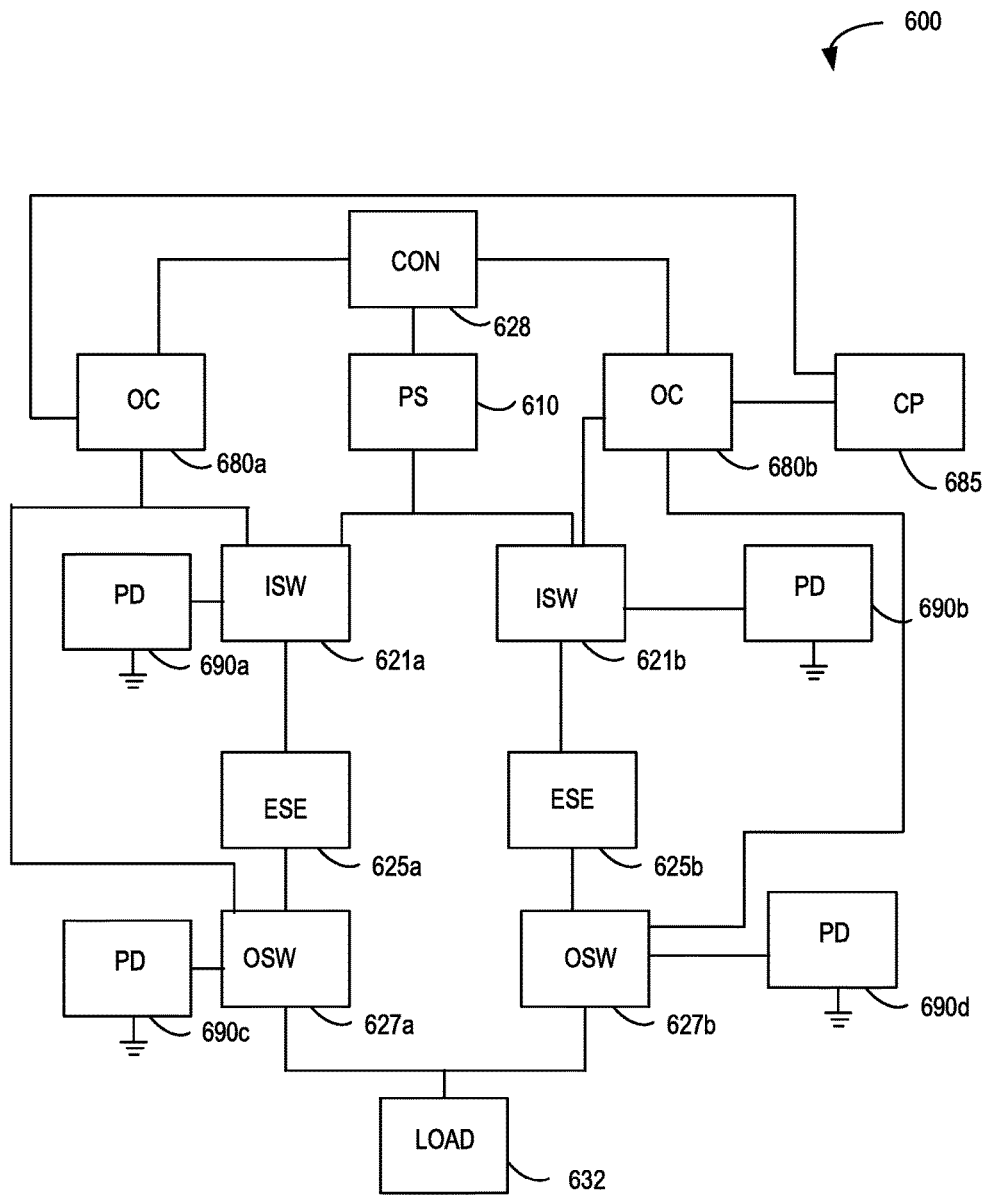
FIG. 6 is an example partial system for combining electrical power from a plurality of power sources.

Referring now to FIG. 6, there is illustrated a partial power combiner system with a circuit having an optocoupler. Power combiner system 600 is analogous to power combiner systems 200, 300A and 400, for example, with elements having numerals that correspond in all but their most significant digits. In FIG. 6, only one power source is illustrated, to aid comprehension.

Therefore, power combiner system 600 has a power source 610, input switches 621a and 621b, energy storage elements 625a and 625b, output switches 627a and 627b, and a controller 628. A load 632 is also connected to each of the output switches 627a and 627b. Although shown as a single element, load 632 may also have multiple elements connected in an electrical network, similar to electrical network 330.

In addition to the above elements, power combiner system has optocouplers 680a and 680b for driving input switches 621a and 621b, respectively. Input switches 621a and 621b may be MOSFETs. Optocouplers 680a and 680b are driven by the controller, with a charge pump 685 providing the gate voltage for the high side transistor, as described herein. Further, input switches 621a and 621b have pull down circuits 690a and 690b, respectively (e.g., transistors).

Output switches 627a and 627b may be configured with pull down circuits 690c and 690d, and/or charge pump power optocouplers, such as optocouplers 680a and 680b. In some cases, separate optocouplers may be provided for output switches 627a and 627b.

Figure 15:
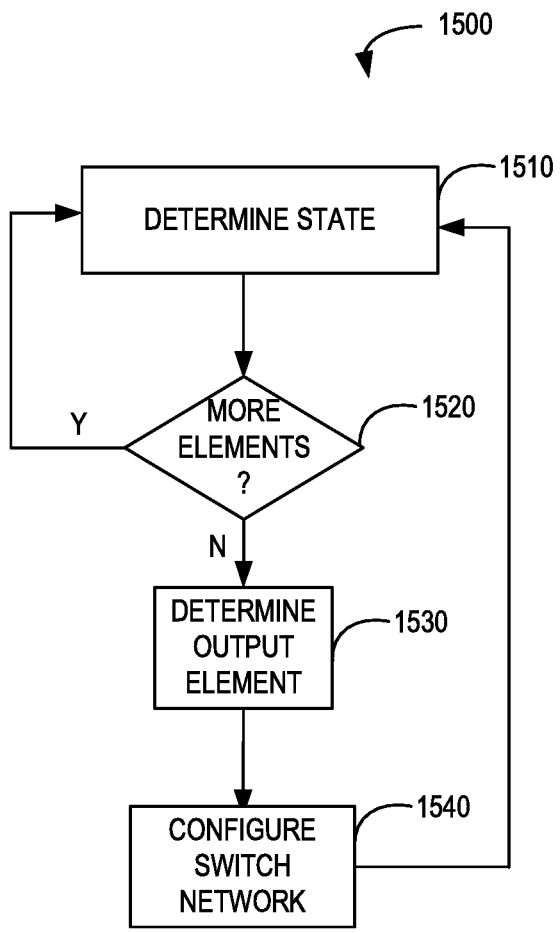
FIG. 15 is a process flow diagram for an example process for combining electrical power from a plurality of power sources.

Referring now to FIG. 15, there is illustrated an example process for combining electrical power from a plurality of power sources. Process 1500 is one example of a control loop that may be executed by a controller, such as controller 228 of system 200, controller 328 of system 300A or system 300B, or controllers 428, 528 or 628.

Process 1500 begins with the provision of a plurality of energy storage elements arranged in a plurality of sets, each of the plurality of sets corresponding to a respective one of a plurality of power sources, as described herein.

At 1510, a controller determines a respective state for each selected element of the plurality of energy storage elements. The respective state may be, for example, a node voltage, current or power level. In some cases, the respective state may be a voltage or power level at a node associated with the energy storage elements (e.g., input or output switch). In some cases, the respective state may be a peak voltage, or a peak charging voltage that corresponds to a highest charging rate for the selected element.

At 1520, the controller determines whether there are additional energy storage elements to evaluate and, if yes, determines the state of the additional energy storage elements by returning to 1510.

Otherwise, the controller continues to 1530 to determine, based on the respective state of each of the plurality of energy storage elements, at least one output element from the plurality of energy storage elements. The determination can be made as described herein, for example, with reference to controller 328. For example, the determining may involve measuring a plurality of node voltages corresponding respectively to the plurality of energy storage elements, and determining that a selected node voltage corresponding to the output element is closest to the respective peak charging voltage of the output element. In some embodiments, the determining may involve determining a plurality of energy levels corresponding respectively to the plurality of energy storage elements, wherein the determining is based on the plurality of energy levels. Minimum or maximum voltages or output power levels may also be computed and used in the determination.

Once the determination of the output element (or elements) is made, the controller proceeds to configure the switch network at 1540 to couple the at least one output element to an electrical network or load. Configuring the switch network can also involve decoupling the output element from its respective power source. Likewise, configuring the switch network may involve decoupling a previous output element from the output and recoupling the previous output element to its respective power source.

The controller then returns to 1510 to periodically repeat the determining and configuring acts, such as decoupling the output element, decoupling the previous output element, recoupling and coupling to selectively switch between the plurality of energy storage elements.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

The invention claimed is:

1. A system for combining electrical power from a plurality of power sources, the system comprising:
   a plurality of capacitors arranged in a plurality of sets, each of the plurality of sets corresponding to a respective one of the plurality of power sources;
   a plurality of voltage sensors coupled respectively to each of the plurality of capacitors;
   a plurality of output switches corresponding respectively to each of the plurality of capacitors;
   a controller communicatively coupled to the plurality of voltage sensors and the plurality of output switches, and configured to:
      determine a respective state for each selected capacitor of the plurality of capacitors;
      determine a maximum power point for each respective power source corresponding to each selected capacitor of the plurality of capacitors;
      determine at least one output capacitor from the plurality of capacitors, the at least one output capacitor having a respective state furthest from a respective maximum power point for a respective power source; and
      direct at least one of the plurality of output switches to couple the at least one output capacitor to at least one output.

2. The system of claim 1, further comprising a plurality of input switches corresponding respectively to each of the plurality of capacitors, each of the plurality of input switches coupling a respective energy storage capacitor to a respective power source, wherein the controller is further configured to decouple the at least one output capacitor from its respective power source.

3. The system of claim 2, wherein the controller is further configured to direct at least one of the output switches to decouple a previous output capacitor from the output, and to direct at least one of the input switches to recouple the previous output capacitor to its respective power source.

4. The system of claim 3, wherein the controller is further configured to periodically repeat the determining, the decoupling the at least one output capacitor, the decoupling the previous output capacitor, the recoupling and the coupling to selectively switch between the plurality of capacitors.

5. The system of claim 4, wherein a period of the periodic repeating is determined based on a discharge time of the plurality of capacitors.

6. The system of claim 1, wherein the controller is configured to determine a plurality of energy levels corresponding respectively to the plurality of capacitors, wherein the selecting is based on the plurality of energy levels.

7. The system of claim 6, wherein the controller is configured to enforce a minimum or maximum output power when selecting the at least one output capacitor.

8. The system of claim 1, wherein the controller is configured to enforce a minimum or maximum output voltage when selecting the at least one output capacitor.

9. The system of claim 1, further comprising a dynamic load, wherein the at least one output capacitor is coupled to the output via a dynamic load.

10. The system of claim 9, wherein the dynamic load is a DC-DC converter.

11. The system of claim 1, wherein the respective state is a peak voltage.

12. The system of claim 1, wherein the respective state is a peak charging voltage that corresponds to a highest charging rate for the selected capacitor.

13. The system of claim 1, wherein the at least one output comprises a plurality of outputs.

14. The system of claim 1, wherein the plurality of output switches have a switching frequency of at least 1 kilohertz (kHz).

15. A method of combining electrical power from a plurality of power sources, the method comprising:
   providing a plurality of capacitors arranged in a plurality of sets, each of the plurality of sets corresponding to a respective one of the plurality of power sources;
   determining a respective state for each selected capacitor of the plurality of capacitors;
   determining a maximum power point for each respective power source corresponding to each selected capacitor of the plurality of capacitors;
   determining at least one output capacitor from the plurality of capacitors, the at least one output capacitor having a respective state furthest from a respective maximum power point for a respective power source; and
   coupling the at least one output capacitor to an electrical network.

16. The method of claim 15, wherein coupling the at least one output capacitor to the electrical network further comprises decoupling the at least one output capacitor from its respective power source.

17. The method of claim 16, wherein coupling the at least one output capacitor to the electrical network comprises decoupling a previous output capacitor from the output and recoupling the previous output capacitor to its respective power source.

18. The method of claim 17, further comprising periodically repeating the determining, the decoupling the at least one output capacitor, the decoupling the previous output capacitor, the recoupling and the coupling to selectively switch between the plurality of capacitors.

19. The method of claim 18, wherein a period of the periodic repeating is determined based on a discharge time of the plurality of storage capacitors.

20. The method of claim 18, wherein the respective state is a peak voltage.

21. The method of claim 18, wherein the respective state is a peak charging voltage that corresponds to a highest charging rate for the selected capacitor.

22. The method of claim 15, wherein the determining further comprises determining a plurality of energy levels corresponding respectively to the plurality of capacitors, wherein the determining is based on the plurality of energy levels.

23. The method of claim 22, wherein the determining further comprises enforcing a minimum or maximum output power.

24. The method of claim 15, wherein the determining further comprises enforcing a minimum or maximum output voltage.

25. The method of claim 15, wherein the at least one output capacitor is coupled to the output via a dynamic load.

26. The method of claim 25, wherein the dynamic load is a DC-DC converter.

27. The method of claim 15, further comprising:
   providing a plurality of output switches corresponding respectively to each of the plurality of capacitors;
   wherein coupling the at least one output capacitor to the electrical network comprises directing at least one of the plurality of output switches to couple the at least one output capacitor to the electrical network; and
   the plurality of output switches switch at a switching frequency of at least 1 kilohertz (kHz).

* * * * *